US010191937B2

United States Patent
Sohn et al.

(10) Patent No.: US 10,191,937 B2
(45) Date of Patent: Jan. 29, 2019

(54) SYSTEM AND METHOD FOR SHARING PROFILE IMAGE CARD

(71) Applicant: Samsung Electronics Co., Ltd., Suwon-si, Gyeonggi-do (KR)

(72) Inventors: Jung Joo Sohn, Seoul (KR); Keum-koo Lee, Yongin-si (KR); Hye-won Lee, Anyang-si (KR); Chul-ho Han, Seoul (KR); Young-kyu Jin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 896 days.

(21) Appl. No.: 14/509,512

(22) Filed: Oct. 8, 2014

(65) Prior Publication Data
US 2015/0106368 A1 Apr. 16, 2015

(30) Foreign Application Priority Data
Oct. 11, 2013 (KR) .................. 10-2013-0121494

(51) Int. Cl.
G06F 17/30 (2006.01)
G06Q 10/10 (2012.01)
G06Q 30/02 (2012.01)
G06Q 50/00 (2012.01)

(52) U.S. Cl.
CPC ....... *G06F 17/30386* (2013.01); *G06Q 10/10* (2013.01); *G06Q 30/02* (2013.01); *G06Q 50/01* (2013.01)

(58) Field of Classification Search
CPC .. G06F 17/30386; G06Q 10/10; G06Q 30/02; G06Q 50/01
See application file for complete search history.

(56) References Cited

U.S. PATENT DOCUMENTS

| 2010/0235228 | A1* | 9/2010 | Torress | G06Q 10/06393 |
| | | | | 705/7.39 |
| 2011/0214066 | A1* | 9/2011 | Chitturi | H04L 67/22 |
| | | | | 715/745 |
| 2012/0036127 | A1 | 2/2012 | Work et al. | |
| 2013/0085890 | A1* | 4/2013 | Hiblum | G06Q 30/08 |
| | | | | 705/26.35 |
| 2013/0110732 | A1 | 5/2013 | Uppal | |
| 2013/0185285 | A1* | 7/2013 | Shuman | G06F 17/30554 |
| | | | | 707/722 |

(Continued)

FOREIGN PATENT DOCUMENTS
EP 1 665 731 B1 2/2007

*Primary Examiner* — Robert W Beausoliel, Jr.
*Assistant Examiner* — Hau Hoang
(74) *Attorney, Agent, or Firm* — Jefferson IP Law, LLP

(57) ABSTRACT

A method of sharing profile image cards of a user of a device is provided. The method may be performed by a server and includes obtaining profile image cards indicating profiles of a first user of a first device related to a field of interest of the first user, categorizing the profile image cards based on pre-set categories, obtaining evaluation information of a second user of a second device regarding the profile image cards, determining rankings of the profile image cards for each of the categories based on the evaluation information, and recommending the profile image cards to at least one other device based on the rankings of the profile image cards.

24 Claims, 18 Drawing Sheets

(56) References Cited

U.S. PATENT DOCUMENTS

| | | | |
|---|---|---|---|
| 2014/0149518 A1* | 5/2014 | Zhao | H04L 51/32 |
| | | | 709/206 |
| 2014/0278821 A1* | 9/2014 | McConnell | G06Q 10/0639 |
| | | | 705/7.38 |
| 2015/0006261 A1* | 1/2015 | Gutman | G06Q 50/22 |
| | | | 705/7.39 |

\* cited by examiner

SYSTEM AND METHOD FOR SHARING PROFILE IMAGE CARD

CROSS-REFERENCE TO RELATED APPLICATION(S)

This application claims the benefit under 35 U.S.C. § 119(a) of a Korean patent application filed on Oct. 11, 2013 in the Korean Intellectual Property Office and assigned Serial No. 10-2013-0121494, the entire disclosure of which is hereby incorporated by reference.

TECHNICAL FIELD

The present disclosure relates to a system and a method for evaluating and sharing user profile image cards.

BACKGROUND

Along with developments in multimedia technologies and network technologies, user services for establishing social relations with other individuals online are increasing. Furthermore, users may develop new personal connections or improve existing personal connections via network services, such as social networking services (SNS). Furthermore, users may access various information online and may easily obtain information about specialists in specific fields.

However, since users may share excessive amounts of information with a plurality of other users via network services, it is difficult for users to efficiently share necessary information.

Therefore, data sharing techniques for users to efficiently access and evaluate information about specialists in specific fields are demanded.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a system and a method for sharing profile image cards to evaluate and recommend profile image cards indicating fields of interest of users.

Additional aspects will be set forth in part in the description which follows and, in part, will be apparent from the description, or may be learned by practice of the various presented embodiments.

In accordance with an aspect of the present disclosure, a method of sharing profile image cards of a user of a device is provided. The method is performed by a server and includes obtaining profile image cards indicating profiles of a first user of a first device related to a field of interest of the first user, categorizing the profile image cards based on pre-set categories, obtaining evaluation information of a second user of a second device regarding the profile image cards, determining rankings of the profile image cards for each of the categories based on the evaluation information, and recommending the profile image cards to at least one other device based on the rankings of the profile image cards.

In an embodiment, a stamp image indicating expertise of a user corresponding to the profile image card is attached to the profile image card.

In the determining of the rankings, rankings of the profile image card regarding the second user may be determined based on evaluation information of acquaintances of the second user, and the method may further include recommending the profile image cards to the second device based on the rankings regarding the second user.

In the obtaining of the profile image cards, the profile image cards may be obtained from the first device accessing a web page provided by the server, and the profile image cards may be transmitted between the first device, the second device, and the at least one other device via an application installed in the first device, the second device, and the at least one other device.

In an embodiment, the evaluation information includes identifiers of profile image cards, identifiers of users who evaluated the profile image cards, and information regarding recommendations of the respective profile image cards, and the information regarding recommendations of the respective profile image cards includes information regarding following numbers and card collecting numbers regarding the respective profile image cards.

In an embodiment, the profile image card is used in conjunction with an application installed in at least one of the first device, the second device, and the at least one other device and is displayed on a display unit of at least one of the devices via the application.

In an embodiment, the profile image card is used in conjunction with a phonebook application of at least one of the first device, the second device, and the at least one other device, is included in a list of users of the phonebook application, and is displayed on a display unit of at least one of the devices.

In the obtaining of the evaluation information from the second device, a web page including the profile image card may be provided to the second device, and, based on a user input that is input to the second device via the web page, the evaluation information may be obtained from the second device.

In an embodiment, the profile image card is displayed in a screen image of an application executed on the second device, and, in the obtaining of the evaluation information from the second device, the evaluation information is received from the second device based on a user input that is input to the second device via the screen image of the application executed on the second device.

In an embodiment, the profile image card includes an image indicating the first user, a text for introducing the first user, and additional information regarding the first user, in relation to fields of interest of the first user.

In an embodiment, a stamp image includes a tag indicating the category of the profile image card.

In accordance with another aspect of the present disclosure, a server for sharing profile image cards of devices is provided. The server includes a registering unit configured to categorize profile image cards indicating profiles of a first user of a first device related to a field of interest of the first user based on pre-set categories, a ranking determining unit configured to determine rankings of the profile image cards for each of the categories based on evaluation information of a second user of a second device regarding the profile image cards, and a recommending unit configured to recommend the profile image cards to at least one other device based on the rankings of the profile image cards.

In an embodiment, a stamp image indicating expertise of a user corresponding to the profile image card is attached to the profile image card.

In an embodiment, the ranking determining unit is further configured to determine rankings of the profile image card regarding the second user based on evaluation information of acquaintances of the second user, and the recommending unit recommends the profile image cards to the second device based on the rankings regarding the second user.

In an embodiment, the profile image cards are obtained from the first device accessing a web page provided by the server, and the profile image cards are transmitted between the first device, the second device, and the at least one other device via an application installed in the first device, the second device, and the at least one other device.

In an embodiment, the evaluation information includes identifiers of profile image cards, identifiers of users who evaluated the profile image cards, and information regarding recommendations of the respective profile image cards, and the information regarding recommendations of the respective profile image cards includes information regarding following numbers and card collecting numbers regarding the respective profile image cards.

In an embodiment, the profile image card is used in conjunction with an application installed in at least one of the first device, the second device, and the at least one other device and is displayed on a display unit of at least one of the devices via the application.

In an embodiment, the profile image card is used in conjunction with a phonebook application of at least one of the first device, the second device, and the at least one other device, is included in a list of users of the phonebook application, and is displayed on a display unit of at least one of the devices.

In the obtaining of the evaluation information from the second device, a web page including the profile image card may be provided to the second device, and, based on a user input that is input to the second device via the web page, the evaluation information may be obtained from the second device.

In an embodiment, the profile image card is displayed in a screen image of an application executed on the second device, and the evaluation information is received from the second device based on a user input that is input to the second device via the screen image of the application executed on the second device.

In an embodiment, the profile image card includes an image indicating the first user, a text for introducing the first user, and additional information regarding the first user, in relation to fields of interest of the first user.

In an embodiment, a stamp image includes a tag indicating the category of the profile image card.

In accordance with another aspect of the present disclosure, a method of sharing profile image cards of a user via a first device is provided. The method includes obtaining profile image cards indicating profiles of a user of a second device in relation to fields of interest of the user, evaluating the obtained profile image cards, and providing evaluation information regarding the obtained profile image cards to a server, wherein rankings of the profile image cards are determined by the server based on the evaluation information, and the profile image cards are recommended to a third device based on the determined rankings.

In accordance with another aspect of the present disclosure, a method of sharing profile image cards via a first device is provided. The method includes receiving profile image cards indicating profiles of a user of a second device in relation to fields of interest of the user from the second device, evaluating the obtained profile image cards from the second device, and transmitting evaluation information regarding the obtained profile image cards to the first device, wherein rankings of the profile image cards are determined by the first device based on the evaluation information, and the profile image cards are recommended to a third device based on the determined rankings.

In accordance with another aspect of the present disclosure, a computer readable recording medium having recorded thereon a computer program for implementing a method in which rankings of the profile image cards are determined by the server based on the evaluation information is provided.

In accordance with another aspect of the present disclosure, a computer readable recording medium having recorded thereon a computer program for implementing a method in which rankings of the profile image cards are determined by the first device based on the evaluation information is provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
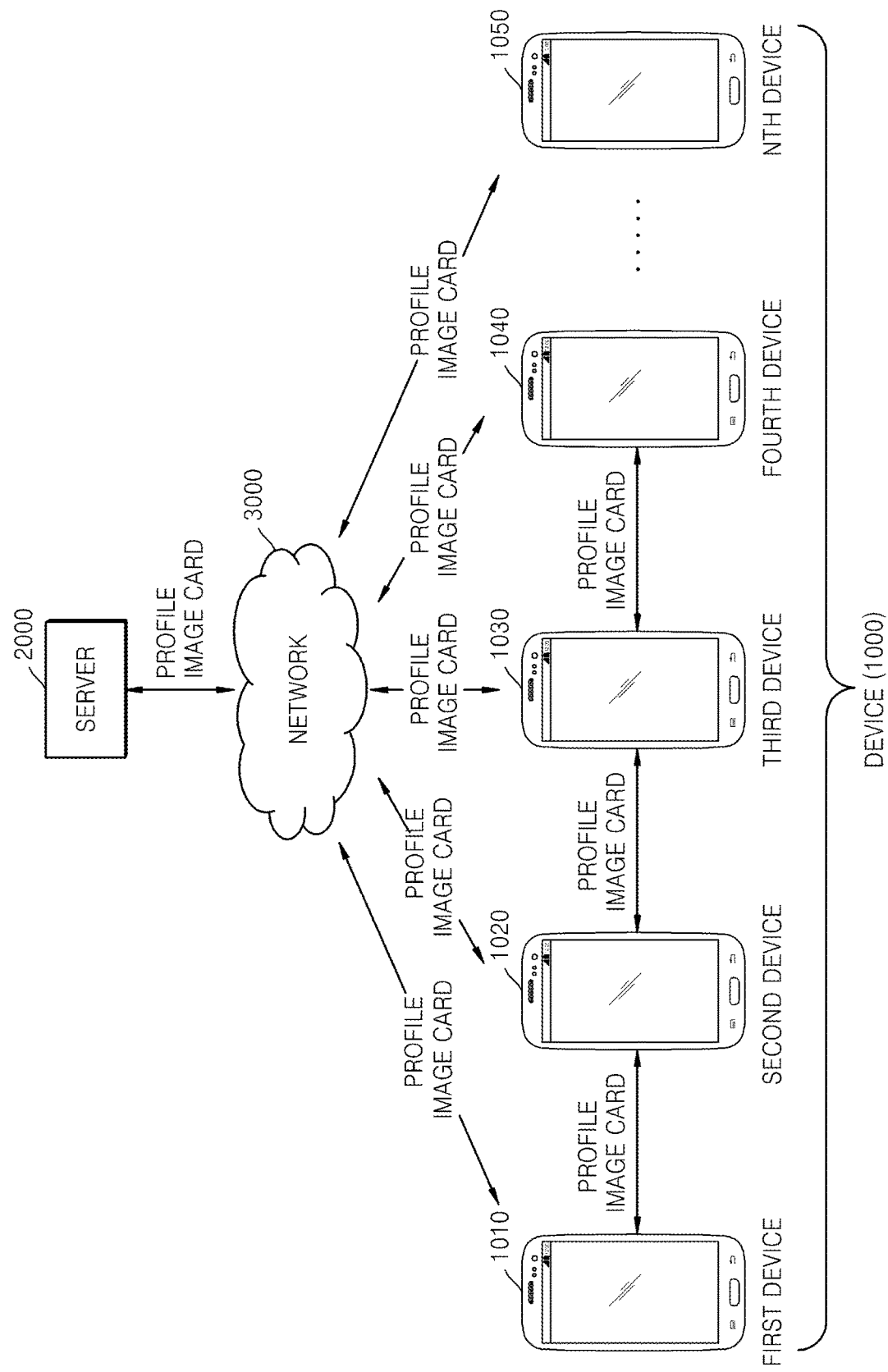
FIG. 1 is a diagram showing a system for sharing profile image cards according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that when a portion is referred to as being "connected to" another portion, it can be not only "directly connected to" the other portion, but also "electrically connected to" the other portion via another device. Furthermore, it will be understood that the terms "comprises" and/or "comprising" used herein specify the presence of stated features or components, but do not preclude the presence or addition of one or more other features or components.

Here, a profile image card is an image card showing profiles of a user of a device. A profile image card may include information for representing a user of a device in relation to fields of interest of the user. Furthermore, a profile image card may include at least one image indicating an occupation of a user.

Furthermore, a profile image card may be generated in any of various forms. For example, a profile image card may be in the form of at least one of a postcard, a name card, an invitation card, and a gift card. However, the present disclosure is not limited thereto.

Furthermore, when it is described that devices share profile image cards, it may mean that the devices share at least one of the profile image cards, evaluation information regarding the profile image cards, and lists of recommendations regarding the profile image card.

Furthermore, a stamp image may be a user interface (UI) object including designated information that a user desires to provide to other users and may be attached to a profile image card or may be included in the profile image card. A stamp image may be an icon including at least one of text, images, geometric figures, and the like. Furthermore, a stamp image may include information regarding a mood of a user, fields of interest of the user, a profile of the user, a location of the user, a link address for using a service of the user, information regarding discount coupons, and the like. Furthermore, a stamp image may include information for indicating the expertise of a user corresponding to a profile image card. However, the present disclosure is not limited thereto.

Furthermore, the term 'contents' may refer to digital information provided via a communication network using a wire or a wireless communication network. Contents according to an embodiment of the present disclosure may include moving picture contents (e.g., television (TV) programs, video on demand (VOD) movies, user-created contents (UCC), music videos, YouTube movies, etc.), still image contents (e.g., pictures, drawings, etc.), music contents (e.g., music files, musical programs, radio broadcasts, etc.), web pages, and information regarding application executions. However, the present disclosure is not limited thereto.

Furthermore, the term 'application' refers to a series of computer program groups designed to perform particular tasks. Various applications may be included herein. For example, various embodiments of the present disclosure may include phonebook applications, game applications, movie player applications, map applications, memo applications, calendar applications, broadcasting applications, fitness assistant applications, payment applications, picture folder applications, etc. However, the present disclosure is not limited thereto.

Furthermore, a user input may include at least one of a touch input, a bending input, a voice input, a key input, multimodal inputs, and the like. However, the present disclosure is not limited thereto. The term "touch input" refers to a gesture performed by a user on a touch screen for controlling a device. For example, a touch input may include a tap, a touch & hold, a double-tap, a drag, a pan, a flick, a drag-and-drop, and the like. Furthermore, the term "motion input" refers to a motion of a user applied to a device for controlling the device. For example, a motion input may include rotating a device, titling a device, moving a device up, down, left, or right, and the like. Furthermore, the term "bending input" refers to (if a device is a flexible display device) an input applied by a user by bending the entire device or a portion of the device for controlling the device. Furthermore, the term "key input" refers to an input for controlling a device applied by a user via a physical key attached to the device. Furthermore, the term "multimodal input" refers to a combination of at least two types of inputs. For example, a device may receive a touch input and a motion input from a user or may receive a touch input and a voice input of a user. Furthermore, a device may receive a touch input and a retina input of a user. The term 'retina input' refers to an input applied by a user for controlling a device by controlling an eye blink, a gazing point, a moving speed of an eyeball, and the like.

Hereinafter, various embodiments of the present disclosure will be described with reference to the attached drawings.

FIG. 1 is a diagram showing a system for sharing profile image cards according to an embodiment of the present disclosure.

Referring to FIG. 1, the system for sharing profile image cards includes at least one device 1000, a server 2000, and a network 3000. Furthermore, the at least one device 1000 may include a first device 1010, a second device 1020, a third device 1030, a fourth device 1040, . . . , and an nth device 1050.

Furthermore, the at least one device 1000 may share profile image cards via the server 2000. However, the present disclosure is not limited thereto. For example, the at least one device 1000 may share profile image cards directly with another device.

The device 1000 generates a user's profile image card and registers the generated profile image card to the server 2000. Furthermore, the device 1000 may evaluate a profile image card registered to the server 2000 and may share profile image cards with another device. Furthermore, the device 1000 may access and evaluate a user's profile image card in another device via a web page provided by the server 2000. However, the present disclosure is not limited thereto, and the device 1000 may directly exchange profile image cards with another device.

Furthermore, a profile image card is used in conjunction with an application installed in the device 1000 and may be displayed on a display unit of the device 1000 via the application installed in the device 1000. For example, the profile image card may be used in conjunction with a phonebook application. The profile image card may be included in a user list of the phonebook application. The profile image included in the user list may be displayed on an execution screen of the phonebook application.

Furthermore, if a user has a plurality of fields of interest, the device 1000 may generate a plurality of profile image cards. For example, if a user is a doctor and has hobbies that include climbing and soccer, the device 1000 may generate a profile image card including the user's profile as a doctor, a profile image card including the user's profile as a climber, and a profile image card including the user's profile as a soccer player, based on user inputs. Furthermore, a user of another device may select at least one of the plurality of profile image cards of the user of the device 1000 and evaluate the selected profile image card(s).

The device 1000 may be a smart phone, a smart TV, a mobile phone, a personal digital assistant (PDA), a laptop personal computer (PC), a media player, a micro server, a global positioning system (GPS), an e-book terminal, a digital broadcasting terminal, a navigation device, a kiosk, an MP3 player, a digital camera, or any other mobile or non-mobile computing devices. However, the present disclosure is not limited thereto.

The server 2000 receives a profile image card from the device 1000 and registers the profile image card. Furthermore, the server 2000 may categorize profile image cards and determine rankings of profile image cards based on evaluation information received from the device 1000 and another device. In this case, the server 2000 may determine rankings of the profile image cards based on evaluation information input via a web page provided by the server 2000 and evaluation information directly received from the device 1000. The evaluation information directly received from the device 1000 may be evaluation information regarding a profile image card directly exchanged between the device 1000 and another device. Furthermore, the evaluation information directly received from the device 1000 may be transmitted from the device 1000 to the server 2000 by an application executed on the device 1000.

The network 3000 includes a local area network (LAN), a wide area network (WAN), a value added network (VAN), a mobile radio communication network, a satellite communication network, and combinations thereof. Furthermore, the network 3000 is a broad term indicating data communication enabling smooth communication between the respective network components shown in FIG. 1 and may include a wired internet, a wireless internet, and a mobile wireless communication network.

Meanwhile, any of the first device 1010, the second device 1020, the third device 1030, the fourth device 1040, . . . , and the nth device 1050 may generate profile image cards, may receive profile image cards users of another device, and evaluate received profile image cards.

Figure 2:
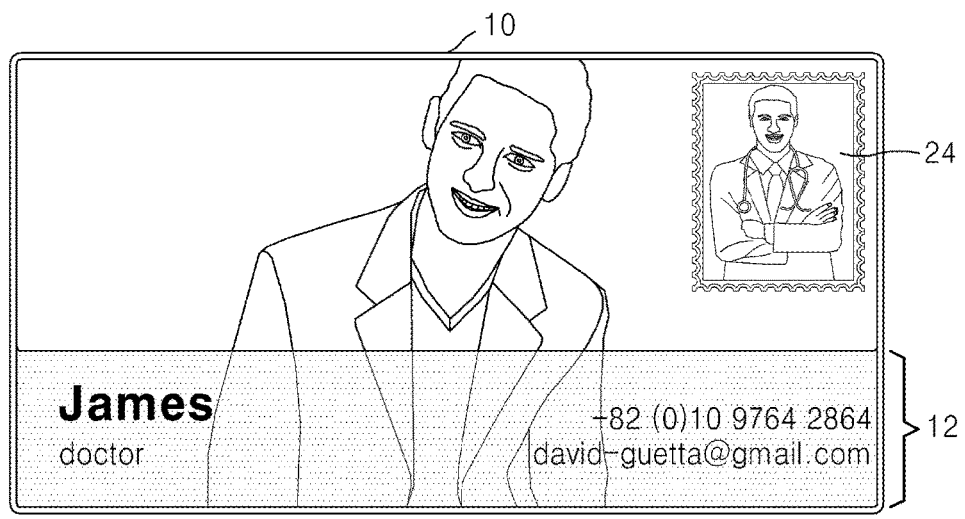
FIG. 2 is a diagram showing an example of profile image cards according to an embodiment of the present disclosure.

FIG. 2 is a diagram showing an example of profile image cards according to an embodiment of the present disclosure.

Referring to FIG. 2, a profile image card according to an embodiment of the present disclosure may include content 10, text 12, and a stamp image 14.

The content 10 may include an image, a moving picture, and/or music for a user to represent himself/herself regarding a corresponding field of interest. Furthermore, the content 10 may include a picture indicating an occupation of a user, a web page of the user, and/or a map image indicating a location of the user. However, the present disclosure is not limited thereto.

Furthermore, the text 12 may be text written by a user to represent himself/herself regarding a corresponding field of interest. For example, the text 12 may include a user's name, a field of interest, a phone number, an e-mail address, a user comment, and the like. However, the present disclosure is not limited thereto.

Furthermore, the stamp image 14 may be a user interface (UI) object including additional information to be provided by a user to other users and may be attached to a profile image card or may be included in the profile image card. For example, the stamp image 14 may be an icon including at least one of text, images, and geometric figures. Furthermore, the stamp image 14 may include information regarding a mood of a user, fields of interest of the user, a profile of the user, a location of the user, a link address for using a service of the user, and the like. Furthermore, the stamp image 14 may include information for indicating the expertise of a user corresponding to a profile image card. However, the present disclosure is not limited thereto.

Furthermore, a tag indicating a category of a profile image card may be attached to a stamp image. A tag attached to a stamp image may be used by the server 2000 and the device 1000 to categorize a corresponding profile image card.

Figure 3A:
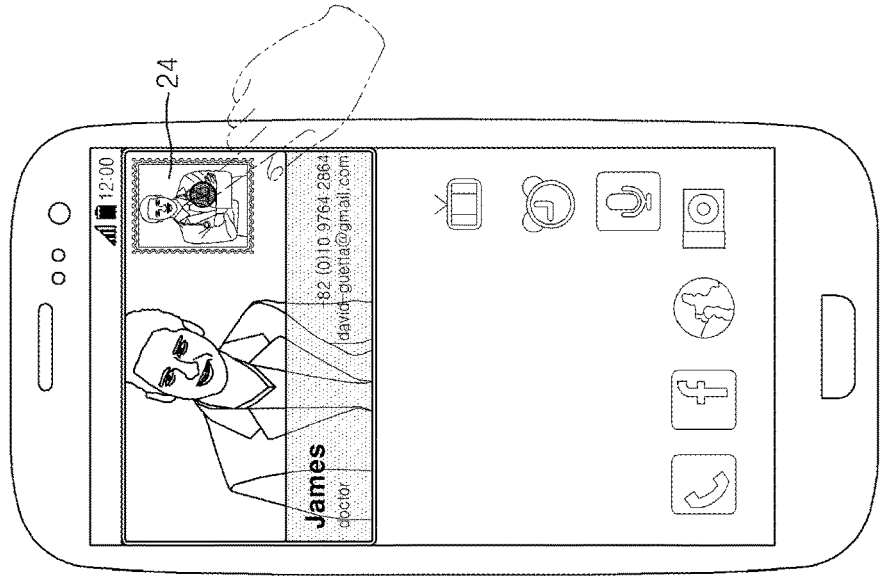
FIGS. 3A, 3B, and 3C are diagrams for describing information linked to a stamp image included in a profile image card according to an embodiment of the present disclosure.
Figure 3B:
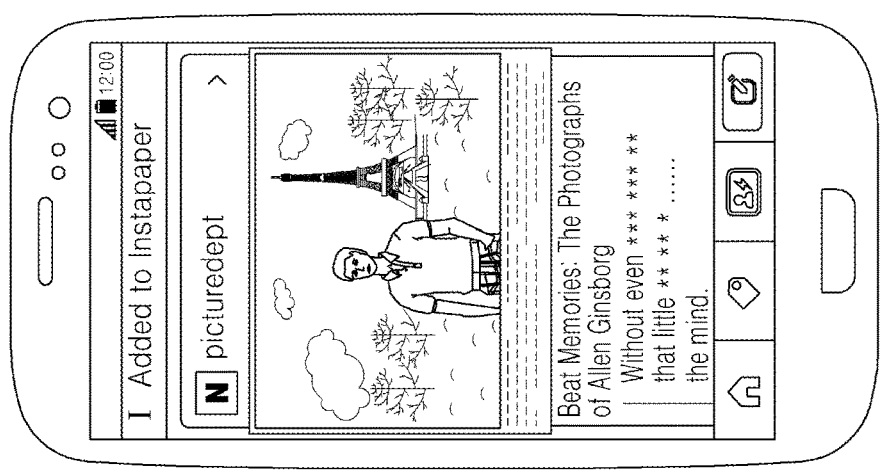
Figure 3C:
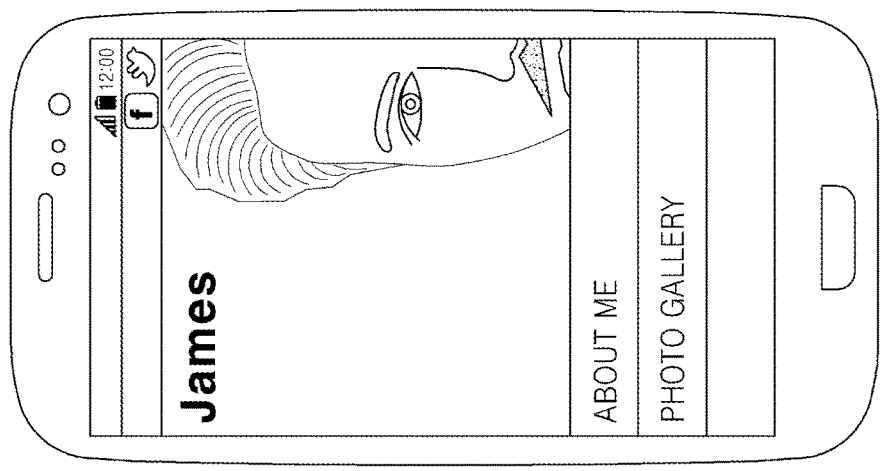

FIGS. 3A to 3C are diagrams for describing information linked to a stamp image included in a profile image card according to an embodiment of the present disclosure.

Referring to FIG. 3A, a user may select a stamp image 24 included in a profile image card displayed on a display unit of the device 1000. Furthermore, when the stamp image 24 is selected, a user's blog linked to the stamp image 24 may be displayed on the display unit of the device 1000 as shown in FIG. 3B. Alternatively, when the stamp image 24 is selected, a user's web page linked to the stamp image 24 may be displayed on the display unit of the device 1000 as shown in FIG. 3C. However, the present disclosure is not limited thereto. For example, when the stamp image 24 is selected, the device 1000 may access a social networking service (SNS) account of a user linked to the stamp image 24.

Figure 4:
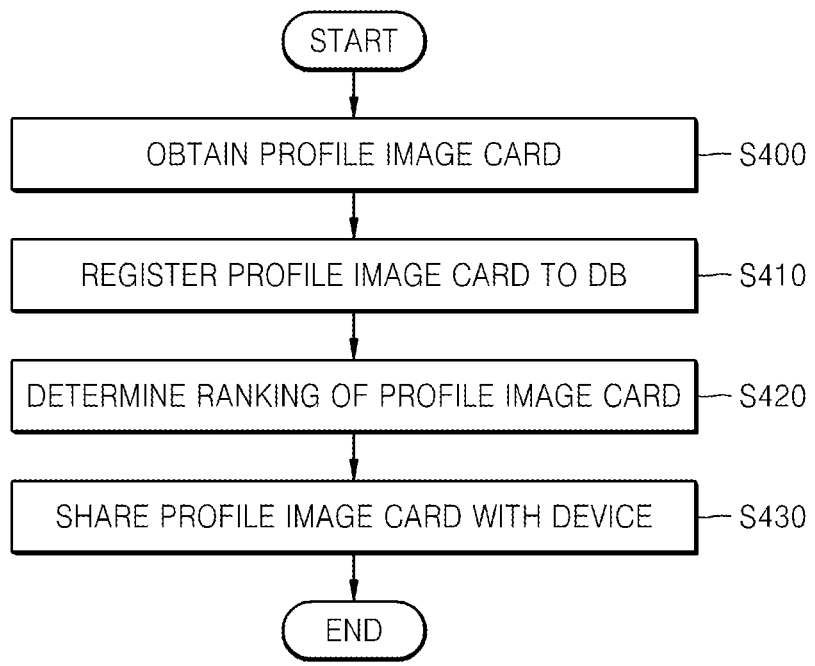
FIG. 4 is a flowchart showing a method of sharing a profile image card by a server according to an embodiment of the present disclosure.

FIG. 4 is a flowchart showing a method of sharing a profile image card by a server according to an embodiment of the present disclosure.

Referring to FIG. 4, the server 2000 obtains a profile image card in operation S400. The server 2000 may receive a profile image card from the device 1000. In this case, the device 1000 may provide a profile image card to the server 2000 via a web page provided by the server 2000. Furthermore, the device 1000 may transmit a profile image card to the server 2000 via an application installed in the device 1000.

In operation S410, the server 2000 registers the profile image card to a database (DB), such as DB 2600 described below. The server 2000 may match the identifier of the device 1000, the identifier of a user of the device 1000, and the profile image card and may register the profile image card to the DB 2600. In this case, a plurality of profile image cards matched to the user of the device 1000 may be registered. Furthermore, another device may select and use at least one of the plurality of profile image cards of the user of the device 1000.

Furthermore, the server 2000 may categorize profile image cards. The server 2000 may recognize information regarding categories of profile image cards from category tags attached to stamp images of the profile image cards. Furthermore, the server 2000 may categorize profile image cards based on recognized category information. Categories of profile image cards may be preset based on fields of interest, occupations, ages, genders, specialties of users, and the like. However, the present disclosure is not limited thereto. Furthermore, category tags attached to stamp images may include information regarding categories of profile image cards. Category tags may include information regarding fields of interest, occupations, ages, genders, and specialties of users, for example.

Furthermore, profile image cards may be included in a plurality of upper/lower categories. For example, a profile image card may be included in an upper category "doctor" and a lower category "internal medicine doctor."

In operation S420, the server 2000 determines rankings of profile image cards. The server 2000 may receive evaluation information regarding profile image cards from the device 1000 and may determine rankings of the profile image cards. In this case, the device 1000 may provide the evaluation information to the server 2000 via a web page provided by the server 2000. Furthermore, the device 1000 may directly transmit the evaluation information to the server 2000 via an application installed in the device 1000.

Furthermore, evaluation information may include identifiers of profile image cards, identifiers of users of the profile image cards, identifiers of users who evaluated the profile image cards, information regarding recommendations of the respective profile image cards, and information regarding evaluation scores of the profile image cards, for example. However, the present disclosure is not limited thereto. Furthermore, the information regarding recommendations of the respective profile image cards may include information regarding following numbers and card collecting numbers regarding the respective profile image cards.

Furthermore, the server 2000 may use preset evaluation information for determining rankings of profile image cards. For example, the server 2000 may determine rankings of profile image cards by using evaluation information received from all users who joined a profile image card providing service provided by the server 2000. Furthermore, the server 2000 may determine rankings of profile image cards by using evaluation information received from specialists related to categories of the profile image cards, for example. Furthermore, the server 2000 may determine rankings of profile image cards by using evaluation information received from acquaintances of a user of the device 1000 to which the profile image cards are to be received, for example. However, the present disclosure is not limited thereto.

Furthermore, the server 2000 may determine rankings of profile image cards based on following numbers and card collecting numbers regarding the respective profile image cards. In this case, the server 2000 may determine the cumulative number of times that each profile image card is followed by a user and the cumulative number of times that the corresponding profile image card is collected and stored by the device 1000. Furthermore, when a user cancels following of a profile image card, the server 2000 may subtract the number of cancellations from the determined following numbers. Furthermore, if a profile image card stored in the device 1000 is deleted, the server 2000 may subtract the number of deletions from the determined collecting numbers.

Furthermore, if the ranking of a profile image card is within a preset range, the server 2000 may certify the expertise of a user corresponding to the profile image card. For example, if the ranking of a profile image card is within the top ten rankings regarding a designated category, the server 2000 may certify expertise of the profile image card and may grant an image effect to the profile image card. For example, the server 2000 may change a color of the profile image card or may attach a stamp image indicating expertise to the profile image card. However, the present disclosure is not limited thereto.

Furthermore, the server 2000 may generate a list of recommendations regarding profile image cards. The server 2000 may generate a list of recommendations of profile image cards for each of the categories. In this case, the server 2000 may generate a list of profile image cards within a designated ranking range from among profile image cards belonging to a designated category.

Furthermore, the server 2000 may respectively generate a list of recommendations regarding profile image cards for each user that wants to receive profile image cards. In this case, the server 2000 may generate a list of recommendations regarding profile image cards related to a user that wants to receive profile image cards. For example, the server 2000 may generate a list of recommendations related to a user that wants to receive profile image cards based on evaluation information of acquaintances of the user.

In operation S430, the server 2000 shares profile image cards with the device 1000. The server 2000 may recommend and provide a profile image card received from the device 1000 to another device. For example, the server 2000 may recommend and provide a profile image card received from the first device 1010 to the second device 1020. In this case, the second device 1020 may receive the profile image card from the server 2000 by accessing a web page provided by the server 2000. Furthermore, the server 2000 may provide a list of recommendations regarding profile image cards to the second device 1020 based on rankings determined based on information regarding evaluations of acquaintances of a user of the second device 1020. Furthermore, the server 2000 may provide a profile image card selected by the second device 1020 from the list of recommendations to the second device 1020.

Figure 5:
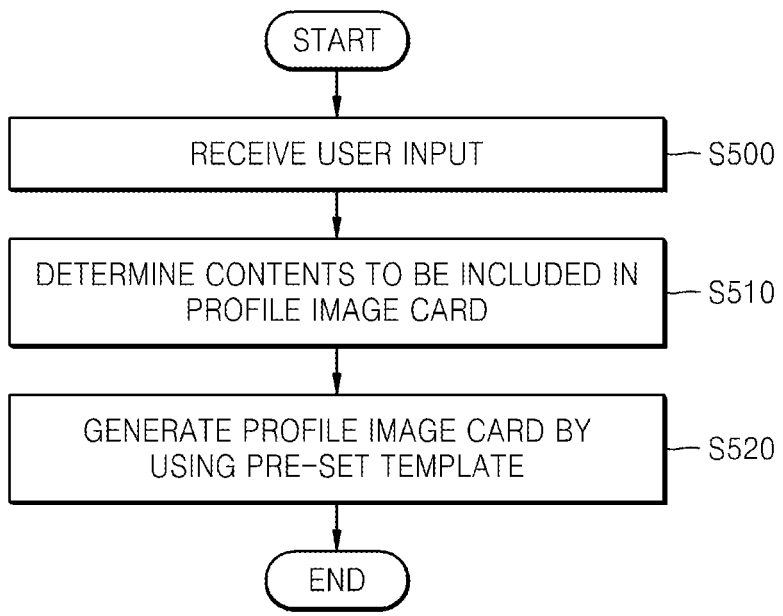
FIG. 5 is a flowchart showing a method whereby a device generates a profile image card according to an embodiment of the present disclosure.

FIG. 5 is a flowchart showing a method whereby a device generates a profile image card according to an embodiment of the present disclosure.

Referring to FIG. 5, the device 1000 receives a user input in operation S500. The user input may be an input for generating a profile image card. The user input may include at least one of key inputs, touch inputs, motion inputs, bending inputs, voice inputs, multi-inputs, and the like.

Furthermore, the device 1000 may include a user input for selecting a preset button. The preset button may be a physical button attached to the device 1000 or a virtual graphical user interface (GUI) button. For example, a user may request the device 1000 to generate a profile image card by selecting a first button (e.g., a home button) and a second button (e.g., a volume control button) together.

Furthermore, the device 1000 may display an icon for requesting a user's profile image card in a screen image. Furthermore, the device 1000 may receive a touch input of a user regarding the displayed icon.

In operation S510, the device 1000 determines contents to be included in a profile image card. Based on a user input, the device 1000 may select at least one of an image, a moving picture, music for introducing a user in relation to a field of interest of the user, and the like. Furthermore, the content may include a picture indicating an occupation of a user, a web page of the user, a map image indicating a location of the user, and the like for example. However, the present disclosure is not limited thereto.

Furthermore, the contents may be stored in the device 1000 or the server 2000 in advance. However, the present disclosure is not limited thereto. For example, when a user presses a button for determining contents to be included in a profile image card, the device 1000 may execute a camera application, so that the user may take a picture to be inserted into a profile image card.

Furthermore, the device 1000 may search for contents to be included in a profile image card. For example, when a user selects a category of a profile image card, the device 1000 may search for contents related to the selected category. For example, if a user selects a category 'doctor,' the device 1000 may search for pictures taken by the user at a hospital and contents related to a hospital of the user.

Furthermore, the device 1000 may search for contents related to a category selected by a user from contents stored in the device 1000 and contents registered to the server 2000 by the user. Furthermore, the device 1000 may search for contents from a search engine server (not shown).

Furthermore, the device 1000 may determine a pre-set number of images. For example, if a pre-set number is 3, the device 1000 may determine 3 images as images to be included in a profile image card. If the number of searched images is 50, the device 1000 may select 3 images from among the 50 images. Furthermore, the device 1000 may provide a list of a plurality of images to a user and receive the user's selection of a designated number of images from the list of the plurality of images.

In operation S520, the device 1000 generates a profile image card by using a pre-set template. The device 1000 may generate a profile image card including contents determined by the device 1000 in the operation S510 based on information regarding the pre-set template. The information regarding a pre-set template is information regarding at least one pre-set template and may include at least one of layout information, theme information, text design information, information regarding an effect filter for modifying an image, and the like for example. However, the present disclosure is not limited thereto.

Furthermore, a template may be set by a user or the device 1000 before a profile image card is generated. For example, the device 1000 or a user may generate at least one template by combining a layout, a theme, a text design, an effect filter, and the like. A pre-set template may be modified by a user of the device 1000.

Furthermore, the device 1000 may generate a profile image card including at least one content by using a pre-set template. For example, the device 1000 may generate a profile image card by arranging at least one image according to a layout, adding a theme image and a text design to the layout, and applying an effect filter (e.g., a grayscale filter).

Furthermore, the device 1000 may insert link information regarding contents (e.g., a uniform resource locator (URL)) to a profile image card. For example, the device 1000 may insert preview moving picture link information, music file link information, and website link information to a profile image card. Furthermore, the device 1000 may receive an input of text related to a profile image card. In this case, the device 1000 may modify text displayed on a profile image card or may add text to a profile image card.

Furthermore, the device 1000 may attach a stamp image to a profile image card. The device 1000 may display a list of stamp images on an edit screen image for generating a profile image card. Stamp images may be categorized according to categories of profile image cards, where categorized stamp images may be arranged according to a pre-set arrangement in the list of stamp images. Furthermore, based on a user input for touching a stamp image and moving the touched stamp image onto a profile image card, the device 1000 may attach the touched stamp image onto the profile image card.

Furthermore, stamp images may include information regarding a mood of a user, fields of interest of the user, a profile of the user, a location of the user, and a link address for using service of the user. Furthermore, a tag indicating a category of a profile image card may be attached to a stamp image. A tag attached to a stamp image may be used by the server 2000 and the device 1000 to categorize a corresponding profile image card.

Figure 6:
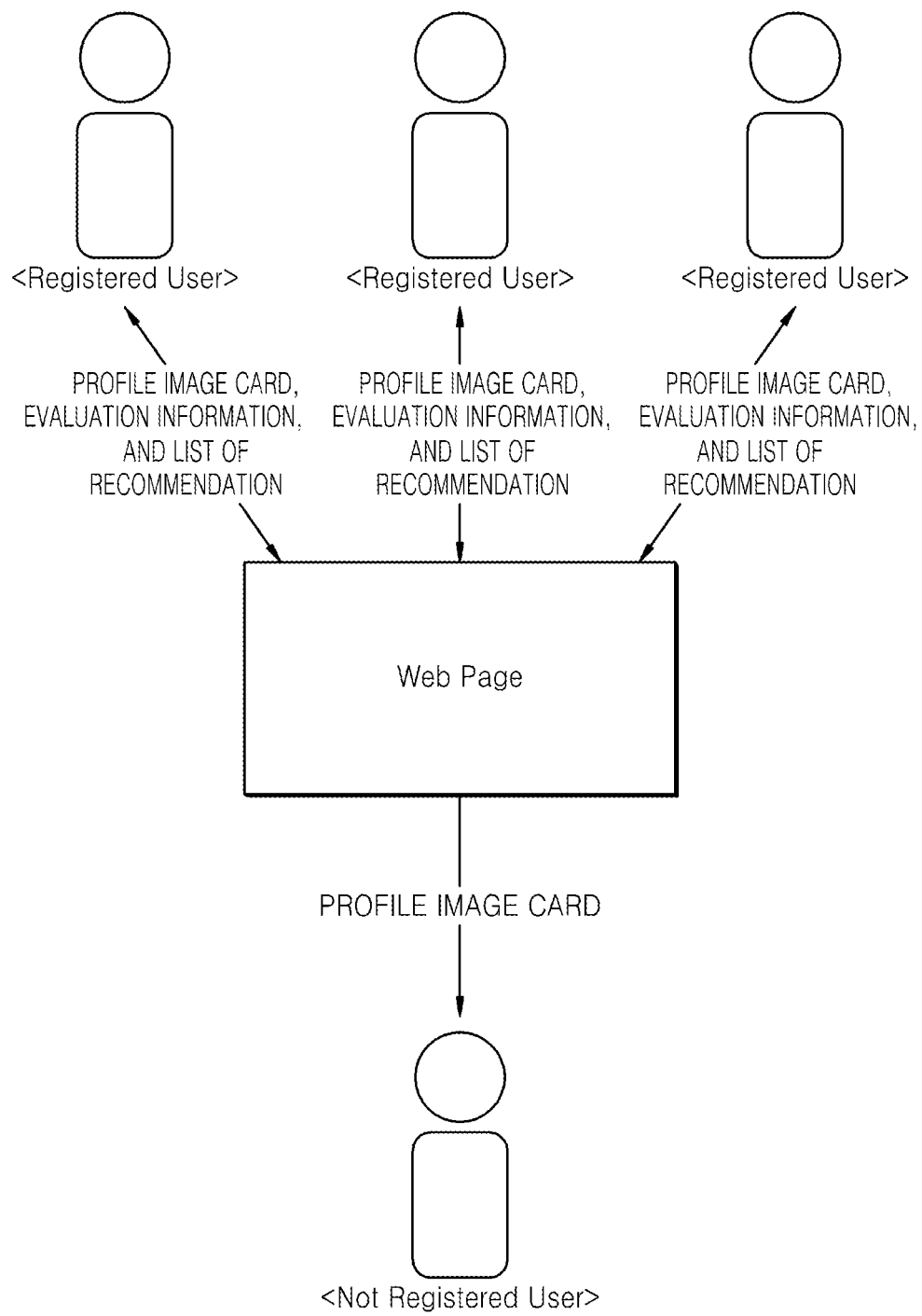
FIG. 6 is a diagram showing an example in which profile image cards are shared between users via a web page provided by a server according to an embodiment of the present disclosure.

FIG. 6 is a diagram showing an example in which profile image cards are shared between users via a web page provided by a server according to an embodiment of the present disclosure.

Referring to FIG. 6, users registered to a profile image card sharing service provided by the server 2000 may access a web page provided by the server 2000 and share profile image cards with other users. The registered users may access a web page provided by the server 2000, upload their own profile image cards, and download profile image cards of other users.

Furthermore, registered users may evaluate profile image cards of other users and may share evaluation information with the server 2000 and other users. Evaluation information may include detailed information showing a person who evaluated a particular profile image card, how the person evaluated the particular profile image card, and which of the profile image cards is the particular profile image card. Furthermore, each of registered users may generate a list of recommendations regarding profile image cards and may share the list of recommendations with other users. Furthermore, the server 2000 may collect lists of recommendations of registered users and may generate various lists of recommendations according to categories, users, and user groups based on evaluation information included in the collected lists of recommendations.

Meanwhile, a user not registered to a profile image card sharing service provided by the server 2000 may use limited services provided by the server 2000. For example, an unregistered user may access a profile image card, but may not be allowed to evaluate the profile image cards.

Figure 7:
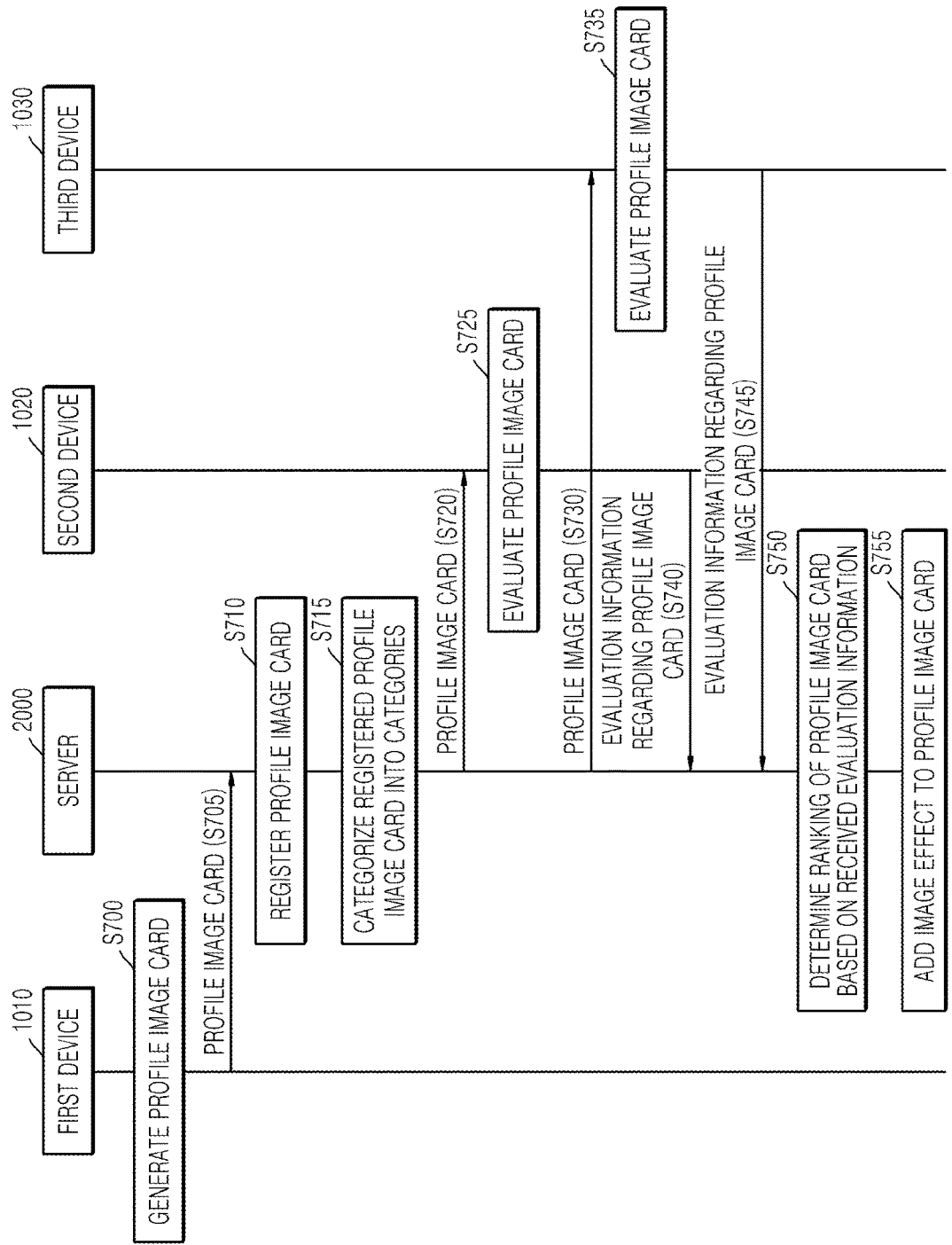
FIG. 7 is a flowchart showing a method in which a device shares profile image cards via a server according to an embodiment of the present disclosure.

FIG. 7 is a flowchart showing a method in which a device shares profile image cards via a server according to an embodiment of the present disclosure.

Referring to FIG. 7, the first device 1010 generates a profile image card in operation S700. To generate a profile image card, the first device 1010 may select a designated template and determine contents to be included in the selected template. The contents may include at least one of images, moving pictures and music for introducing a user in relation to fields of interest of the user. For example, the contents may include a picture indicating occupation of a user, a web page of the user, and/or a map image indicating location of the user.

Furthermore, the first device 1010 may attach a stamp image to a profile image card. Furthermore, a stamp image may include information regarding a mood of a user, fields of interest of the user, a profile of the user, a location of the user, a link address for using service of the user, and the like. Furthermore, a tag indicating a category of a profile image card may be attached to a stamp image. A tag attached to a stamp image may be used by the server 2000 and the first device 1010 to categorize a corresponding profile image card.

Furthermore, the first device 1010 may access a web page provided by the server 2000 and may generate a profile image card by using a UI provided by the web page. However, the present disclosure is not limited thereto. The first device 1010 may generate a profile image card by using a UI provided by an application installed in the first device 1010.

In operation S705, the first device 1010 provides a profile image card to the server 2000. The first device 1010 may transmit a profile image card to the server 2000 via a web page provided by the server 2000. However, the present disclosure is not limited thereto, and the first device 1010 may directly transmit a profile image card to the server 2000 by using an application installed in the first device 1010.

In operation S710, the server 2000 registers a profile image card. The server 2000 may match the identifier of the first device 1010, the identifier of a user of the first device 1010, and the profile image card and may register the profile image card to a DB, such as the DB 2600 described later. If the server 2000 receives a plurality of profile image cards from the first device 1010, the server 2000 may register a plurality of profile image cards matched to a user of the first device 1010.

In operation S715, the server 2000 categorizes profile image cards. The server 2000 may recognize information regarding categories of the profile image card based on category tags attached to stamp images of the profile image cards. Furthermore, the server 2000 may categorize profile image cards based on information regarding the recognized categories. Categories of profile image cards may be preset based on fields of interest, occupations, ages, genders, specialties of users, and the like. However, the present disclosure is not limited thereto. Furthermore, category tags attached to stamp images may include information regarding categories of profile image cards. Category tags may include information regarding fields of interest, occupations, ages, genders, and specialties of users, for example. Furthermore, profile image cards may be included in a plurality of upper/lower categories. For example, a profile image card may be included in an upper category "doctor" and a lower category "internal medicine doctor."

In operation S720, the server 2000 provides a profile image card to the second device 1020. The second device 1020 may access a web page provided by the server 2000 and request a profile image card to the server 2000. Furthermore, the second device 1020 may directly request a profile image card to the server 2000 via an application installed in the second device 1020. Furthermore, the server 2000 may provide a profile image card to the second device 1020 in response to a request.

Furthermore, the server 2000 may receive user information regarding a user of the second device 1020 from the second device 1020 and may recommend a profile image card to the user of the second device 1020. For example, the server 2000 may receive an identifier of the second device 1020, an identifier of a user of the second device 1020, an ID of the user of the first device 1010 regarding a SNS service the user signed in, a location of the user of the second device 1020, and the like. Furthermore, the server 2000 may provide a list of recommendations for the user of the second device 1020 regarding a category selected by the user of the second device 1020 to the second device 1020. Furthermore, the second device 1020 may select a designated profile image card from among a list of recommendations and may request the selected profile image card to the server 2000.

In operation S725, the second device 1020 evaluates a profile image card. A user of the second device 1020 may evaluate a service provided by a user corresponding to a particular profile image card. For example, in the case of a profile image card of 'James' who is a 'doctor,' a user of the second device 1020 may be diagnosed in a hospital, evaluate a service provided by 'James,' and may input evaluation information regarding a profile image card of 'James' to the second device 1020. Furthermore, a user of the second device 1020 may give a score or may not recommend a profile image card of 'James.'

In operation S730, the server 2000 provides a profile image card to the third device 1030. The third device 1030 may access a web page provided by the server 2000 and request a profile image card to the server 2000. Furthermore, the third device 1030 may directly request a profile image card to the server 2000 via an application installed in the third device 1030. Furthermore, the server 2000 may provide a profile image card to the third device 1030 in response to a request.

Furthermore, the server 2000 may receive user information regarding a user of the third device 1030 from the third device 1030 and may recommend a profile image card to the user of the third device 1030. For example, the server 2000 may receive an identifier of the third device 1030, an identifier of a user of the third device 1030, an ID of the user of the first device 1010 regarding a SNS service the user signed into, a location of the user of the third device 1030, and the like. Furthermore, the server 2000 may provide a list of recommendations for the user of the third device 1030 regarding a category selected by the user of the third device 1030 to the third device 1030. Furthermore, the third device 1030 may select a designated profile image card from among a list of recommendations and may request the selected profile image card to the server 2000.

In operation S735, the third device 1030 evaluates a profile image card. A user of the third device 1030 may evaluate a service provided by a user corresponding to a particular profile image card. For example, in the case of a profile image card of 'James' who is a 'climber,' a user of the third device 1030 may evaluate climbing skills of 'James,' and may input evaluation information regarding a profile image card of 'James' to the third device 1030. Furthermore, a user of the third device 1030 may give a score or may or may not recommend a profile image card of 'James.'

In operation S740, the second device 1020 provides evaluation information regarding profile image cards to the server 2000. Here, the evaluation information may include detailed information showing a person who evaluated a particular profile image card, how the person evaluated the particular profile image card, and which of the profile image cards is the particular profile image card. For example, the evaluation information may include user information regarding a user of the second device 1020 who evaluated a profile image card, an identifier of the profile image card, a score given to the profile image card, and information regarding recommendation of the profile image card.

Furthermore, the second device 1020 may provide evaluation information to the server 2000 via a web page provided by the server 2000. However, the present disclosure is not limited thereto, and the second device 1020 may directly provide evaluation information to the server 2000 via an application installed in the second device 1020.

In operation S745, the third device 1030 may provide evaluation information to the server 2000 via a web page provided by the server 2000. However, the present disclosure is not limited thereto, and the third device 1030 may directly provide evaluation information to the server 2000 via an application installed in the third device 1030.

In operation S750, the server 2000 determines rankings of profile image cards based on received evaluation information. The server 2000 may determine rankings of profile image cards with respect to each category. Furthermore, the server 2000 may extract designated evaluation information and may determine rankings of profile image cards based on the extracted evaluation information.

For example, the server 2000 may extract evaluation information received from all users registered to a profile image card providing service provided by the server 2000 and may determine rankings of profile image cards based on the extracted evaluation information. Furthermore, the server 2000 may extract evaluation information received from users who are certified as specialists in the category of a corresponding profile image card and may determine rankings of profile image cards based on the extracted evaluation information. Furthermore, the server 2000 may determine rankings of profile image cards regarding a particular user based on evaluation information received from acquaintances of the particular user. In this case, the server 2000 may recognize acquaintances of the particular user by using a SNS ID of the particular user and may extract evaluation information received from the acquaintances.

Furthermore, the server 2000 may generate a list of recommendations regarding profile image cards. The server 2000 may generate a list of recommendations of profile image cards for each of the categories. In this case, the server 2000 may generate a list of profile image cards within a designated ranking range from among profile image cards belonging to a designated category.

Furthermore, the server 2000 may respectively generate a list of recommendations regarding profile image cards for each user that wants to receive profile image cards. In this case, the server 2000 may generate a list of recommendations regarding profile image cards related to a user that wants to receive profile image cards. For example, the server 2000 may generate a list of recommendations related to a user that wants to receive profile image cards based on evaluation information of acquaintances of the user.

In operation S755, the server 2000 adds an image effect to a profile image card. If the ranking of a profile image card is lower than a preset ranking, the server 2000 may certify the expertise of a user corresponding to the profile image card. For example, if the ranking of the profile image card of a doctor 'James' is within the top ten rankings in a category 'doctor,' the server 2000 may certify the expertise of the doctor 'James' corresponding to the profile image card and may add an image effect to the profile image card of the doctor 'James.' For example, the server 2000 may change color, brightness, and contrast of a profile image card, may change a thickness and color of borderlines of the profile image card, may attach a stamp image indicating the expertise to the profile image card, and the like. However, the present disclosure is not limited thereto.

Furthermore, although FIG. 7 shows that the first device 1010 generates a profile image card and the second device 1020 and the third device 1030 receive and evaluate the profile image card, the present disclosure is not limited thereto. The second device 1020 and the control unit 1300 may generate profile image cards, and the first device 1010 may receive and evaluate the profile image cards.

Figure 8:
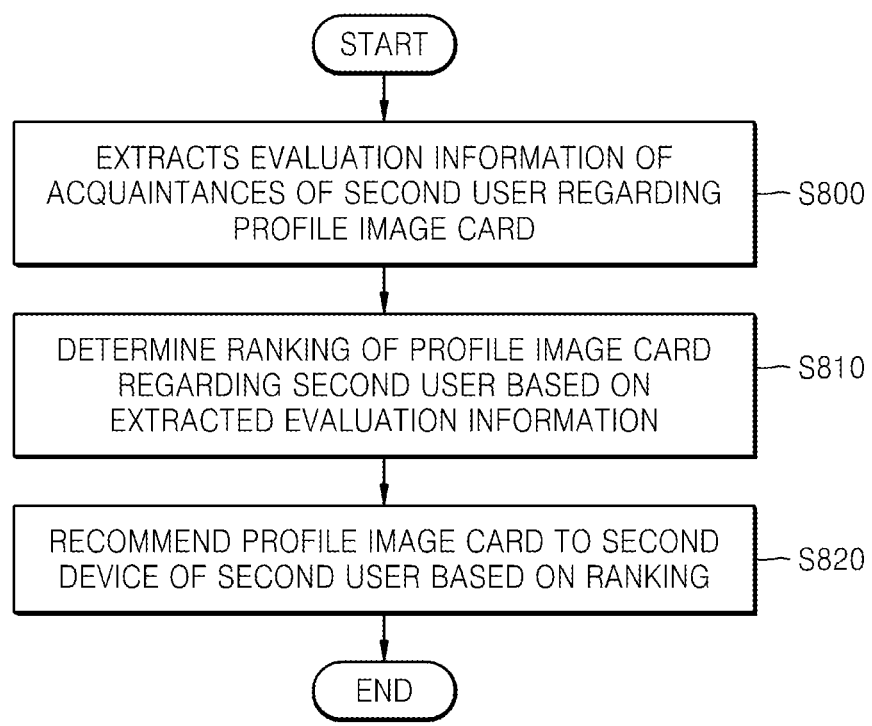
FIG. 8 is a flowchart showing a method in which a server determines rankings of profile image cards regarding designated users according to an embodiment of the present disclosure.

FIG. 8 is a flowchart showing a method in which a server determines rankings of profile image cards regarding designated users according to an embodiment of the present disclosure. For convenience of explanation, a user of the first device 1010 will be referred to as a first user, and a user of the second device 1020 will be referred to as a second user.

Referring to FIG. 8, the server 2000 extracts evaluation information of acquaintances of the second user regarding a profile image card in operation S800. The acquaintances of the second user may be other users who are friends of the second user and other users included in a phonebook of the second device 1020. Furthermore, the profile image card may be a profile image card of the first user and a profile image card of another user. The server 2000 may receive user information regarding the second user from the second device 1020 and may recognize acquaintances of the second user based on the received user information. For example, the server 2000 may recognize acquaintances of the second user by using SNS IDs of the second user. Furthermore, the server 2000 may receive a phonebook from the second device 1020 and may extract user information regarding users included in the phonebook, thereby recognizing acquaintances of the second user. Furthermore, the server 2000 may extract evaluation information generated by recognized acquaintances from evaluation information regarding profile image cards.

In operation S810, the server 2000 determines the ranking of a profile image card regarding the second user, based on the extracted evaluation information. The server 2000 may determine the ranking of a profile image card regarding the second user based on evaluation information generated by acquaintances of the second user only. However, the present disclosure is not limited thereto. The server 2000 may determine the ranking of a profile image card regarding the second user by applying a relatively high weight to evaluation information generated by acquaintances of the second user compared to weight applied to other evaluation information. Furthermore, the server 2000 may determine rankings of profile image cards in a category selected by the second user.

In operation S820, the server 2000 recommends a profile image card to the second device 1020 of the second user based on the determined rankings. The server 2000 may generate a list of profile image cards within a designated ranking range from among the profile image cards in the selected category. Furthermore, the server 2000 may transmit a generated list to the second device 1020.

Figure 9:
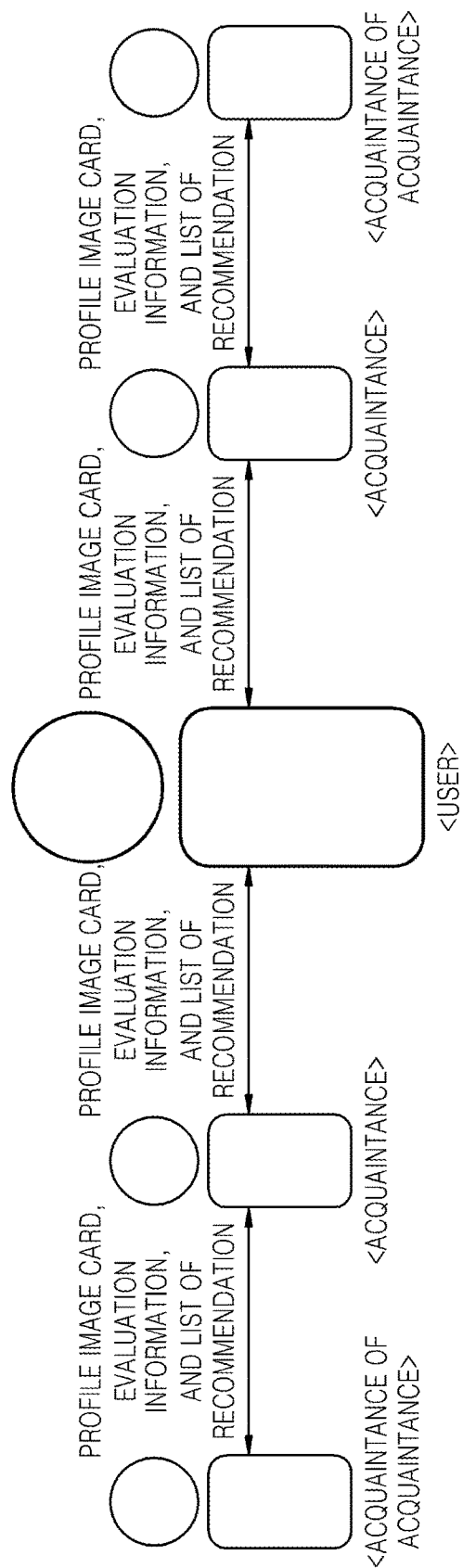
FIG. 9 is a diagram showing an example in which profile image cards are directly shared between users according to an embodiment of the present disclosure.

FIG. 9 is a diagram showing an example in which profile image cards are directly shared between users according to an embodiment of the present disclosure.

Referring to FIG. 9, users may exchange profile image cards and may share the profile image cards and information regarding the same. A user may transmit/receive profile image cards and evaluation information regarding the profile image cards to/from another device of another user via an application installed in a device. Furthermore, a user may transmit/receive a list of recommendations regarding profile image cards with another device of another user via an application installed in a device.

Furthermore, a user may check lists of recommendations of acquaintances regarding particular categories via the device 1000. Furthermore, the server 2000 may collect profile image cards, evaluation information, and lists of recommendations exchanged between users.

Figure 10:
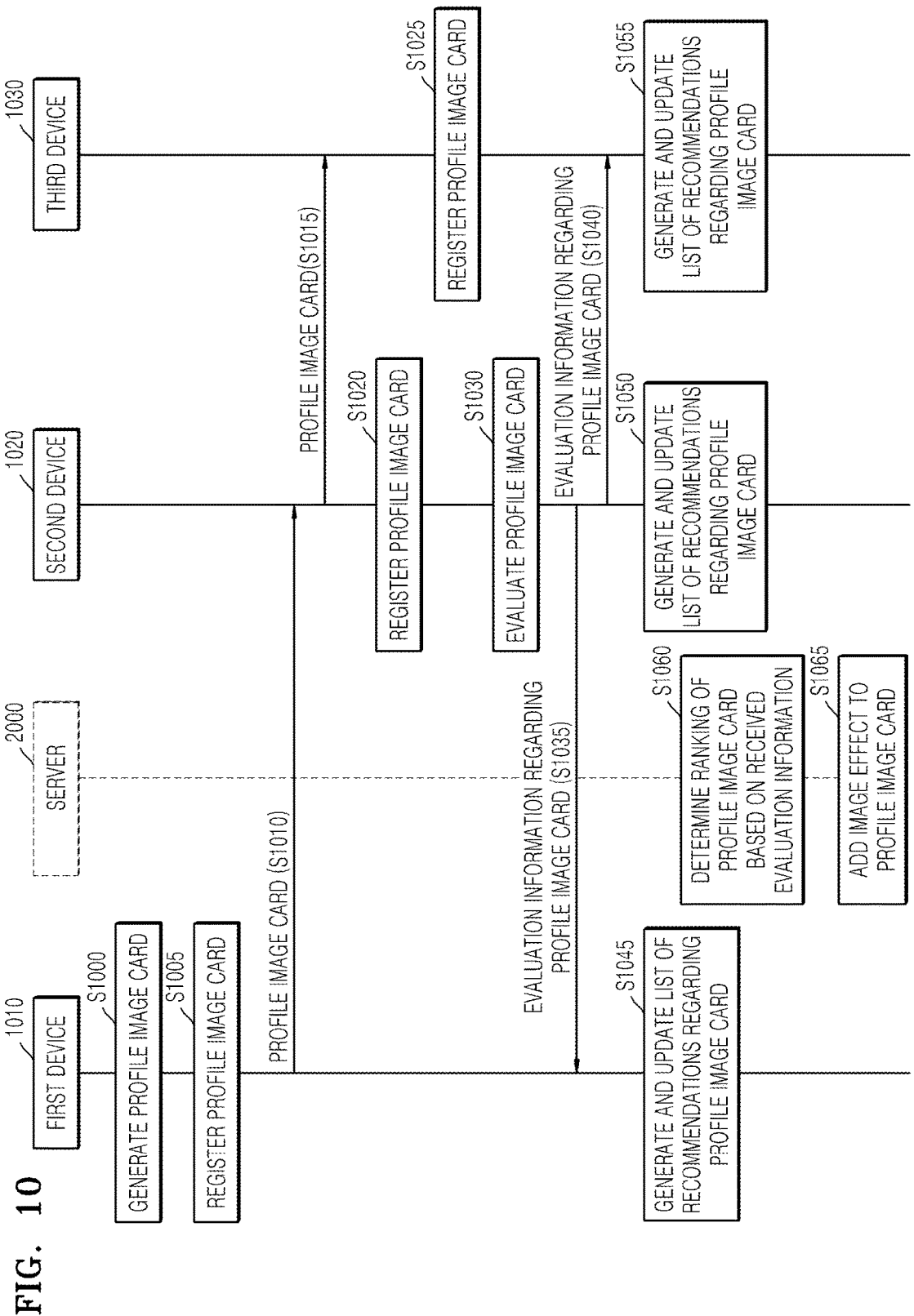
FIG. 10 is a flowchart showing a method in which devices directly share profile image cards according to an embodiment of the present disclosure.

FIG. 10 is a flowchart showing a method in which devices directly share profile image cards according to an embodiment of the present disclosure. The operations shown in FIG. 10 may be performed by designated applications installed in the first device 1010, the second device 1020, and the third device 1030, respectively.

Referring to FIG. 10, the first device 1010 generates a profile image card in operation S1000. To generate a profile image card, the first device 1010 may select a designated template and determine contents to be included in the selected template. The content may include an image, a moving picture, and/or music for a user to represent himself/herself regarding a corresponding field of interest. Furthermore, the content may include a picture indicating occupation of a user, a web page of the user, and/or a map image indicating location of the user. However, the present disclosure is not limited thereto.

Furthermore, the first device 1010 may attach a stamp image to a profile image card. For example, a stamp image may include information regarding a mood of a user, fields of interest of the user, a profile of the user, a location of the user, a link address for using service of the user, and the like. Furthermore, a tag indicating a category of a profile image card may be attached to a stamp image. A tag attached to a stamp image may be used by the server 2000 and the first device 1010 to categorize a corresponding profile image card.

In operation S1005, the first device 1010 registers a profile image card to a memory of the first device 1010. The first device 1010 may match the identifier of the first device 1010, the identifier of a user of the first device 1010, and the profile image card and may register the profile image card to the memory of the first device 1010. If the first device 1010 generated a plurality of profile image cards, the first device 1010 may register a plurality of profile image cards.

Furthermore, the first device 1010 may categorize profile image cards. The first device 1010 may recognize information regarding categories of the profile image card based on category tags attached to stamp images of the profile image cards. Furthermore, the first device 1010 may categorize profile image cards based on information regarding the recognized categories.

In operation S1010, the first device 1010 transmits a profile image card to the second device 1020. The first device 1010 and the second device 1020 may be connected to each other via a designated application installed in the first device 1010 and the second device 1020. Furthermore, the second device 1020 may request a profile image card to the first device 1010 via an application installed in the second device 1020, and the first device 1010 may transmit the requested profile image card to the second device 1020 via an application installed in the first device 1010.

In operation S1015, the second device 1020 transmits a profile image card to the third device 1030. The second device 1020 and the third device 1030 may be connected to each other via a designated application installed in the second device 1020 and the third device 1030. Furthermore, the third device 1030 may request a profile image card to the second device 1020 via an application installed in the third device 1030, and the second device 1020 may transmit the requested profile image card to the third device 1030 via an application installed in the second device 1020.

In operation S1020, the second device 1020 registers a profile image card to a memory of the second device 1020. The second device 1020 may match the identifier of the first device 1010, the identifier of a user of the first device 1010, and the profile image card and may register the profile image card to the memory of the second device 1020. If the first device 1010 generated a plurality of profile image cards, the second device 1020 may register a plurality of profile image cards. Furthermore, the second device 1020 may categorize profile image cards. The second device 1020 may recognize information regarding categories of the profile image card based on category tags attached to stamp images of the profile image cards. Furthermore, the second device 1020 may categorize profile image cards based on information regarding the recognized categories.

In operation S1025, the third device 1030 registers a profile image card to a memory of the third device 1030. The third device 1030 may match the identifier of the first device 1010, the identifier of a user of the first device 1010, and the profile image card and may register the profile image card to the memory of the third device 1030. If the first device 1010 generated a plurality of profile image cards, the third device 1030 may register a plurality of profile image cards.

Furthermore, the third device 1030 may categorize profile image cards. The third device 1030 may recognize information regarding categories of the profile image card based on category tags attached to stamp images of the profile image cards. Furthermore, the third device 1030 may categorize profile image cards based on information regarding the recognized categories.

In operation S1030, the second device 1020 evaluates a profile image card. A user of the second device 1020 may evaluate a service provided by a user corresponding to a particular profile image card. For example, in the case of a profile image card of 'James' who is a 'climber,' a user of the second device 1020 may evaluate climbing skills of 'James,' and may input evaluation information regarding a profile image card of 'James' to the second device 1020. Furthermore, a user of the second device 1020 may give a score or may or may not recommend a profile image card of 'James.'

Furthermore, the second device 1020 may determine rankings of profile image cards based on following numbers and card collecting numbers regarding the respective profile image cards. In this case, the second device 1020 may determine the cumulative number of times that each of profile image cards is followed by a user and the cumulative number of times that the corresponding profile image card is collected and stored by the device 1000 of another user. Furthermore, when a user cancels following of a profile image card, the second device 1020 may subtract the number of cancellations from the determined following numbers. Furthermore, if a profile image card stored in the device 1000 is deleted, the second device 1020 may subtract the number of deletions from the determined collecting numbers.

The second device 1020 transmits evaluation information regarding profile image cards to the first device 1010 in operation S1035, and the second device 1020 transmits evaluation information regarding profile image cards to the third device 1030 in operation S1040. Here, the evaluation information may include detailed information showing a person who evaluated a particular profile image card, how the person evaluated the particular profile image card, and which of the profile image cards is the particular profile image card. For example, the evaluation information may include user information regarding a user of the second device 1020 who evaluated a profile image card, an identifier of the profile image card, a score given to the profile image card, and information regarding recommendation of the profile image card.

In operation S1045, the first device 1010 may generate and update a first list of recommendations regarding profile image cards. The first device 1010 may determine rankings of profile image cards registered to the first device 1010 based on evaluation information received from the second device 1020. Furthermore, based on the determined rankings, the first device 1010 may generate and update a first list of recommendations regarding the profile image cards. Furthermore, the first device 1010 may transmit a first list of recommendations to the second device 1020 and the third device 1030. Furthermore, a list of recommendations transmitted to the second device 1020 and the third device 1030 may be used by the second device 1020 and the third device 1030 to generate a second list of recommendations and a third list of recommendations, respectively.

In operation S1050, the second device 1020 may generate and update a second list of recommendations regarding profile image cards. The second device 1020 may receive evaluation information and a first list of recommendations from the first device 1010 and may receive evaluation information and a third list of recommendations from the third device 1030. Furthermore, the second device 1020 may determine rankings of profile image cards registered to the second device 1020. Furthermore, based on the determined rankings, the second device 1020 may generate and update a first list of recommendations regarding the profile image cards. Furthermore, the second device 1020 may transmit a second list of recommendations to the first device 1010 and the third device 1030. Furthermore, a second list of recommendations transmitted to the first device 1010 and the third device 1030 may be used by the first device 1010 and the third device 1030 to generate a first list of recommendations and a third list of recommendations, respectively.

In operation S1055, the third device 1030 may generate and update a third list of recommendations regarding profile image cards. The third device 1030 may receive evaluation information and a first list of recommendations from the first device 1010 and may receive evaluation information and a second list of recommendations from the second device 1020. Furthermore, the third device 1030 may determine rankings of profile image cards registered to the third device 1030. Furthermore, based on the determined rankings, the third device 1030 may generate and update a first list of recommendations regarding the profile image cards. Furthermore, the third device 1030 may transmit a third list of recommendations to the first device 1010 and the second device 1020. Furthermore, a third list of recommendations transmitted to the first device 1010 and the second device 1020 may be used by the first device 1010 and the second device 1020 to generate a first list of recommendations and a second list of recommendations, respectively.

In operation S1060, the server 2000 determines rankings of profile image cards. The server 2000 collects information related to the operations S1000 through S1055 from the first device 1010, the second device 1020, and the third device 1030 and may determine rankings of profile image cards based on the collected information. The server 2000 may obtain profile image cards registered to the devices, evaluation information generated by the devices, and lists of recommendations generated by the devices, for example.

Furthermore, the server 2000 may determine rankings of profile image cards in each category. Furthermore, the server 2000 may extract designated evaluation information and may determine rankings of profile image cards based on the extracted evaluation information.

For example, the server 2000 may extract evaluation information received from all users who joined a profile image card providing service provided by the server 2000 and may determine rankings of profile image cards based on the extracted evaluation information. Furthermore, the server 2000 may determine rankings of profile image cards by using evaluation information received from users certified as specialists in categories of the profile image cards, for example. Furthermore, the server 2000 may determine rankings of profile image cards by using evaluation information received from acquaintances of a particular user, for example. In this case, the server 2000 may recognize acquaintances of the particular user by using SNS IDs of the particular user and may extract evaluation information received from the acquaintances.

Furthermore, the server 2000 may generate a list of recommendations regarding profile image cards. The server 2000 may generate lists of recommendations regarding profile image card of categories, respectively. In this case, the server 2000 may generate a list of recommendations regarding profile image cards within a designated ranking range in a designated category.

Furthermore, the server 2000 may respectively generate a list of recommendations regarding profile image cards for each user that wants to receive profile image cards. In this case, the server 2000 may generate a list of recommendations regarding profile image cards related to a user that wants to receive profile image cards. For example, the server 2000 may generate a list of recommendations related to a user that wants to receive profile image cards based on evaluation information of acquaintances of the user.

In operation S1065, the server 2000 adds an image effect to a profile image card. If the ranking of a profile image card is lower than a preset ranking, the server 2000 may certify the expertise of a user corresponding to the profile image card. For example, if the ranking of the profile image card of a doctor 'James' is within the top ten rankings in a category 'doctor,' the server 2000 may certify the expertise of the doctor 'James' corresponding to the profile image card and may add an image effect to the profile image card of the doctor 'James.' For example, the server 2000 may change colors, brightness, and contrast of a profile image card, may change a thickness and color of borderlines of the profile image card, or may attach a stamp image indicating the expertise to the profile image card. However, the present disclosure is not limited thereto.

Although FIG. 10 shows that the first device 1010 generates a profile image card and the second device 1020 and the third device 1030 receive the profile image card, the present disclosure is not limited thereto. The second device 1020 and the control unit 1300 may generate profile image cards, and the first device 1010 may receive the profile image cards.

Furthermore, although FIG. 10 shows that the second device 1020 evaluates profile image cards and transmits evaluation information regarding the profile image cards to the first device 1010 and the third device 1030, the present disclosure is not limited thereto. The first device 1010 and the third device 1030 may evaluate profile image cards and transmit evaluation information.

Figure 11:
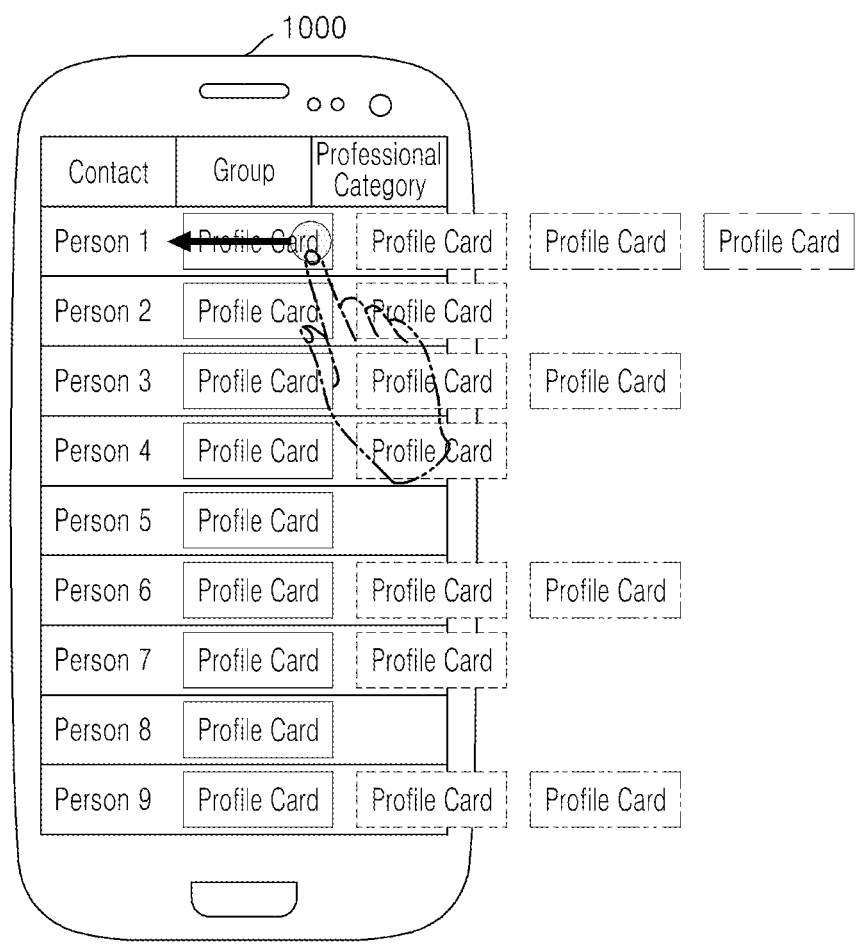
FIG. 11 is a diagram showing an example in which a profile image card is displayed via an application of a device according to an embodiment of the present disclosure.

FIG. 11 is a diagram showing an example in which a profile image card is displayed via an application of a device according to an embodiment of the present disclosure.

Referring to FIG. 11, a list of users in a phonebook may be displayed on a display unit of the device 1000, and names and profile image cards of users may be displayed in a list of users. Profile image cards displayed in a list of users may be profile image cards generated by the users displayed in the list of users. For example, a profile image card generated by a 'person 1' may be displayed in a field labeled with 'Person 1' in a list of users.

Furthermore, a plurality of profile image cards regarding the 'Person 1' may be stored in the device 1000. In this case, when a swipe input regarding a profile image card is received, the device 1000 may display another profile image card regarding the 'Person 1' on the display unit. Furthermore, a user of the device 1000 may store a part of a plurality of profile image cards regarding the 'Person 1' and may delete the other part.

Figure 12A:
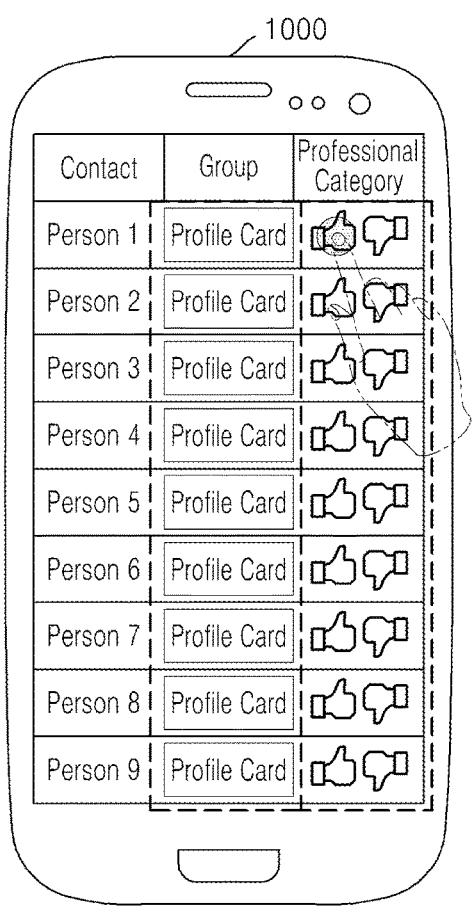
FIGS. 12A and 12B are diagrams for describing an example in which evaluation information regarding profile image cards is generated and a server determines rankings of the profile image cards based on the generated evaluation information according to an embodiment of the present disclosure.
Figure 12B:
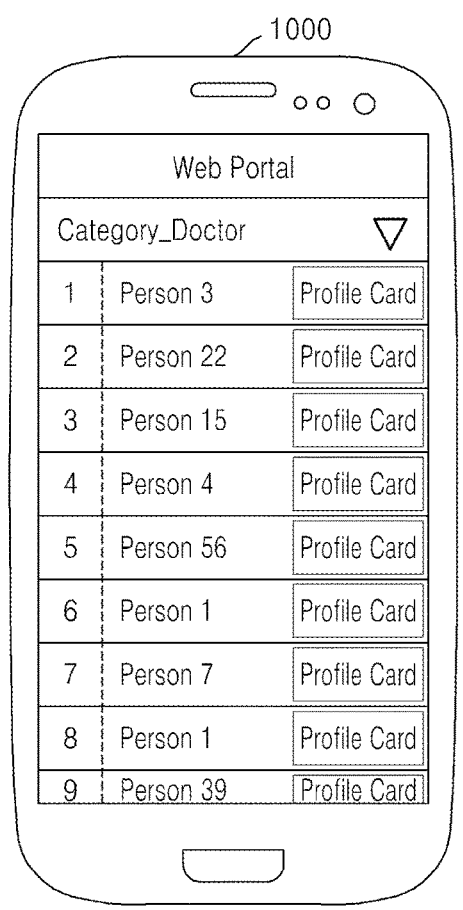

FIGS. 12A and 12B are diagrams for describing an example in which evaluation information regarding profile image cards is generated and a server determines rankings of the profile image cards based on the generated evaluation information according to an embodiment of the present disclosure.

Referring to FIG. 12A, an icon for evaluating a profile image card may be displayed next to the profile image card. For example, a user may touch an icon for evaluating a user's profile image card of a 'Person 1.' In this case, the device 1000 may transmit evaluation information indicating that the user recommended the profile image card of the 'Person 1.'

Therefore, as shown in FIG. 12B, the server 2000 may generate and update a list of recommendations regarding profile image cards on a web page based on received evaluation information. For example, the server 2000 may determine rankings of profile image cards based on the numbers of recommendations regarding the profile image cards. Furthermore, the server 2000 may generate and update a list of recommendations based on the determined rankings.

Figure 13A:
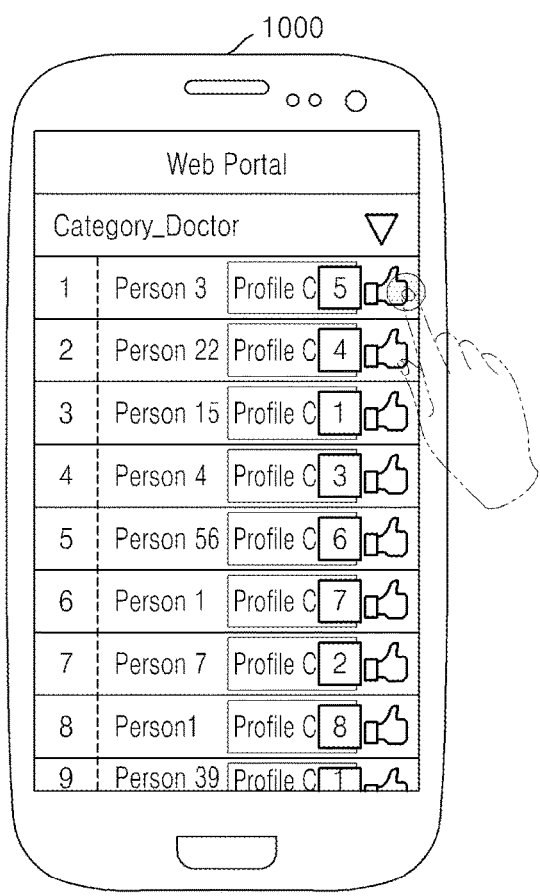
FIGS. 13A and 13B are diagrams for describing a case in which profile image cards are recommended via a web page and the numbers of recommendations are updated according to an embodiment of the present disclosure.
Figure 13B:
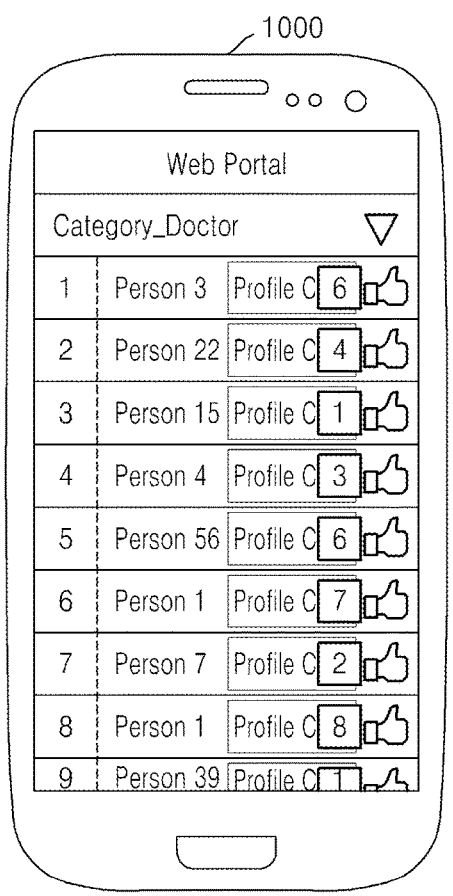

FIGS. 13A and 13B are diagrams for describing a case in which profile image cards are recommended via a web page and the numbers of recommendations are updated according to an embodiment of the present disclosure.

Referring to FIG. 13A, a list of recommendations regarding profile image cards may be displayed on a display unit of the device 1000 via a web page provided by the server 2000. Furthermore, icons for recommending profile image cards and the numbers of times that the profile image cards are recommended may be displayed in the list of recommendations regarding the profile image cards. For example, the number of times that a profile image card regarding a 'Person 3' is recommended may be 5, and a user may touch an icon for recommending the profile image card of the 'Person 3.'

Therefore, as shown in FIG. 13B, the server 2000 updates the number of recommendations regarding the profile image card of the 'Person 3' and may reflect the updated number of recommendations to the list of recommendations.

Figure 14A:
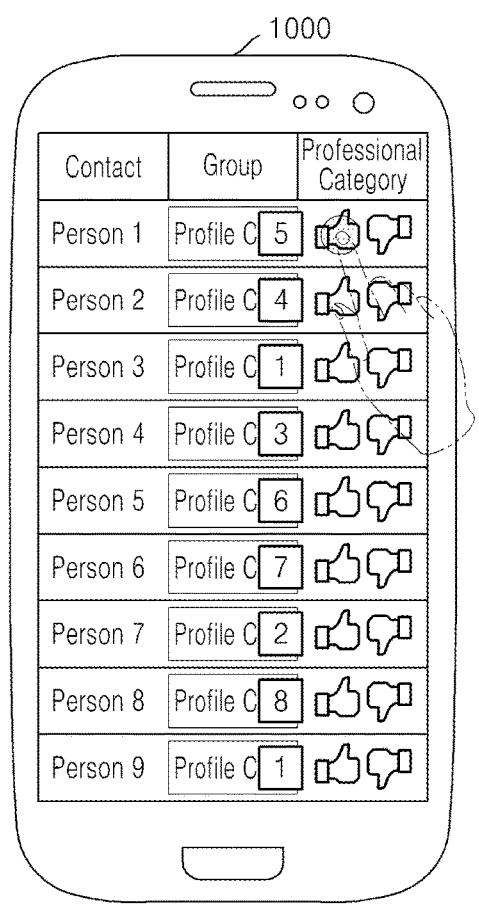
FIGS. 14A and 14B are diagrams showing an example in which a list of recommendations generated by a device is updated according to an embodiment of the present disclosure.
Figure 14B:
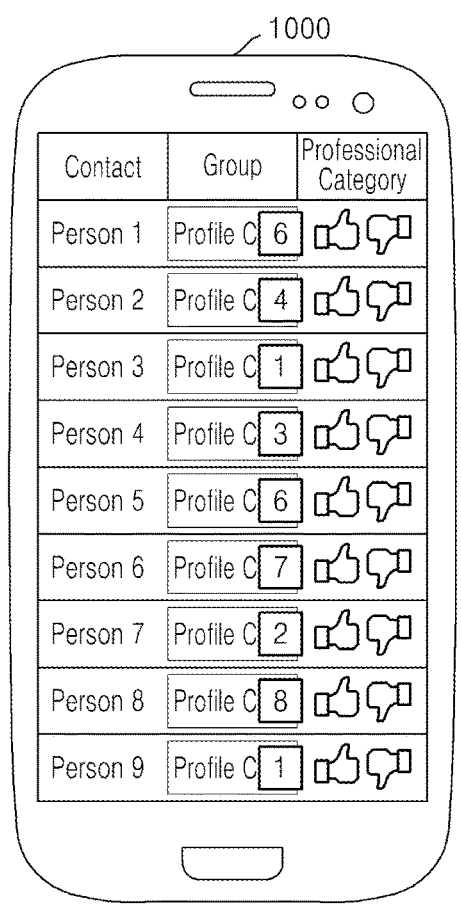

FIGS. 14A and 14B are diagrams showing an example in which a list of recommendations generated by the device is updated according to an embodiment of the present disclosure.

Referring to FIG. 14A, a list of recommendations regarding a profile image card may be displayed on a display unit of the device 1000 via a phonebook application of the device 1000. The device 1000 may generate and display a list of recommendations regarding profile image cards registered to the device 1000. Furthermore, icons for recommending profile image cards and the numbers of times that the profile image cards are recommended may be displayed on the list of recommendations regarding the profile image card. For example, the number of times that a profile image card regarding a 'Person 1' is recommended may be 5, and a user may touch an icon for recommending the profile image card of the 'Person 1.'

Therefore, as shown in FIG. 14B, the device 1000 updates the number of recommendations regarding the profile image card of the 'Person 1' and may reflect the updated number of recommendations to the list of recommendations.

Figure 15A:
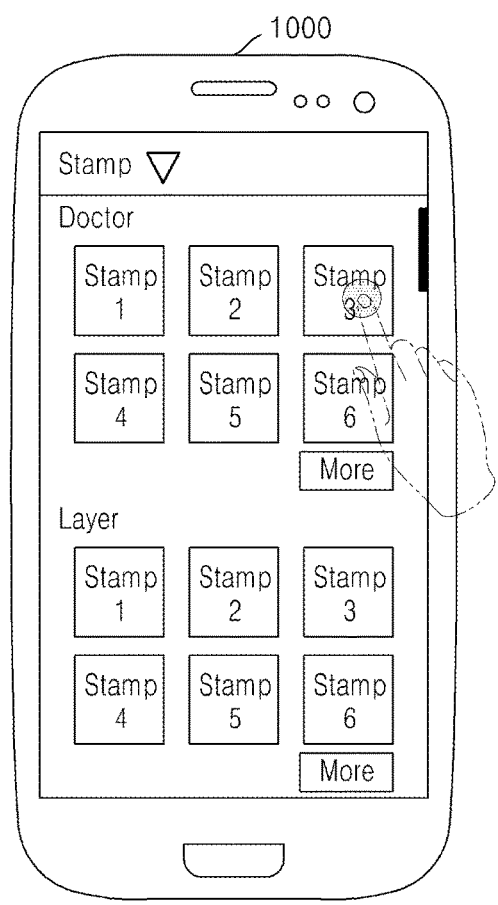
FIGS. 15A and 15B are diagrams showing an example in which a stamp image is attached to a profile image card according to an embodiment of the present disclosure.
Figure 15B:
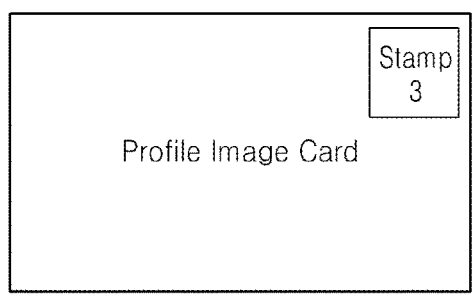

FIGS. 15A and 15B are diagrams showing an example in which a stamp image is attached to a profile image card according to an embodiment of the present disclosure.

Referring to FIG. 15A, a list of stamp images may be displayed on a display unit of the device 1000. Stamp images may be generated in correspondence to categories of profile image cards in advance, and the stamp images may be arranged according to categories in the list of the stamp images. Furthermore, a user may attach a stamp image to a profile image card by selecting a designated stamp image in the list of the stamp images, as shown in FIG. 15B.

Figure 16:
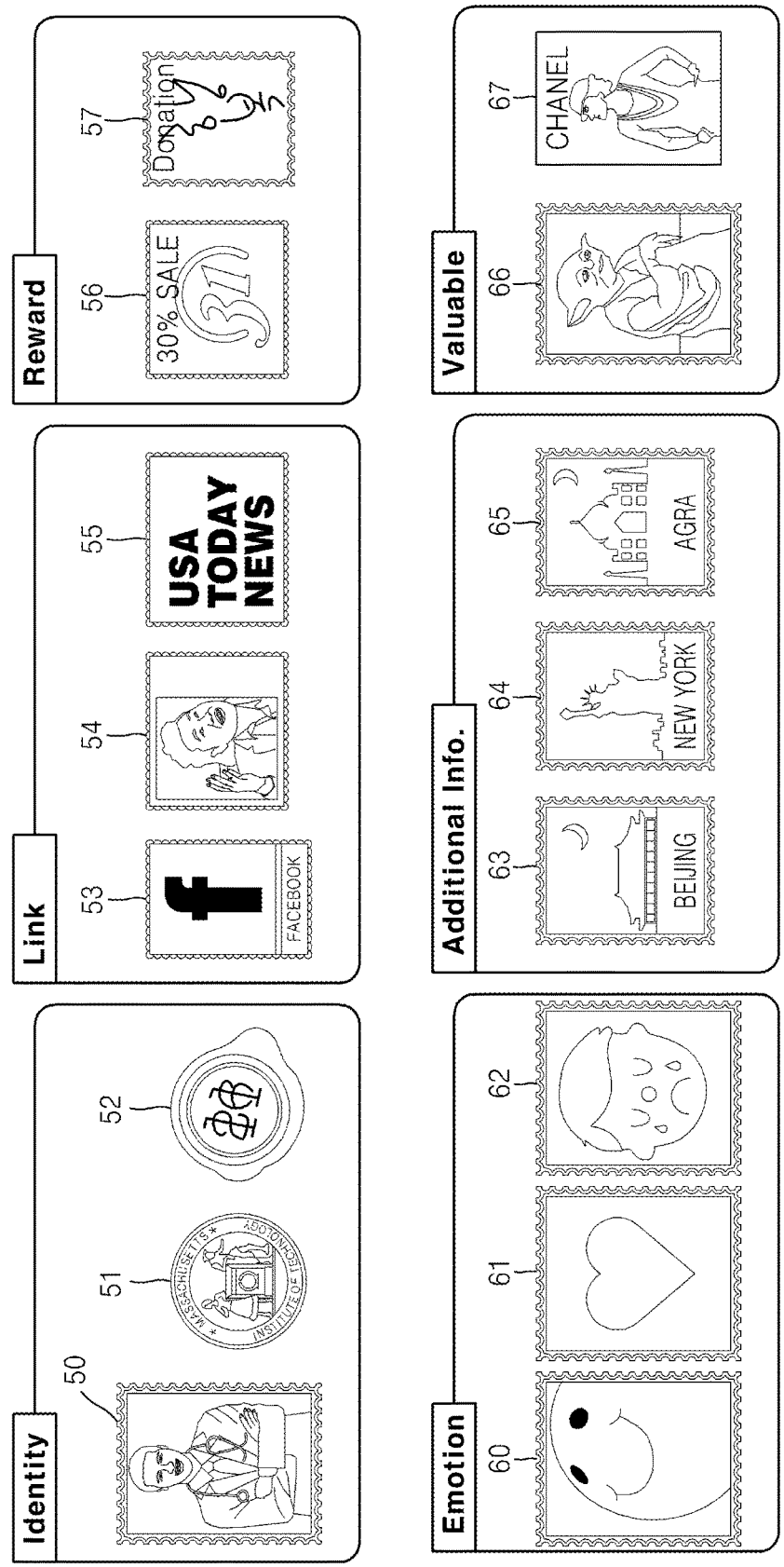
FIG. 16 is a diagram showing an example of stamp images according to an embodiment of the present disclosure.

FIG. 16 is a diagram showing an example of stamp images according to an embodiment of the present disclosure.

Referring to FIG. 16, stamp images may be categorized based on properties of the stamp images. Stamp images 50, 51, and 52 may be stamp images showing profiles of a user. The stamp images 50, 51, and 52 may indicate a picture of a user, an emblem of a school that the user graduated from, and an emblem of an organization the user belongs to, respectively. Of course, these are merely example of possible stamp images showing a profile of a user.

Furthermore, stamp images 53, 54, and 55 may be stamp images for using services provided by a user. The stamp images 53, 54, and 55 may include link addresses for using services provided by the user. As the stamp images 53, 54, and 55 are selected on a profile image card, the device 1000 may access designated web pages by using the link addresses included in the stamp images 53, 54, and 55.

Furthermore, stamp images 56 and 57 may be stamp images having economic value. For example, the stamp image 56 may include information regarding a discount coupon. As the stamp image 56 is selected by a user, the device 1000 may download a designated discount coupon. Furthermore, the stamp image 57 may be a stamp image for making a donation to a designated organization, for example.

Furthermore, stamp images 60, 61, and 62 may be stamp images indicating emotions of a user. The stamp images 60, 61, and 62 may be attached to a profile image card and indicate emotions of a user corresponding to the profile image card.

Furthermore, stamp images 63, 65, and 65 may be stamp images for indicating additional information. For example, the stamp images 63, 65, and 65 may indicate a location of the device 1000 or a user.

Furthermore, stamp images 66 and 67 may be stamp images for indicating a value of a profile image card to which the stamp images 66 and 67 are attached or a worth of an owner of the stamp images 66 and 67. The stamp images 66 and 67 may be provided to a user as the user purchases designated products. Alternatively, the stamp images 66 and 67 may be purchased by a user. Furthermore, a stamp image may have one or more properties and may be exchanged, given, or sold between users.

Figure 17A:
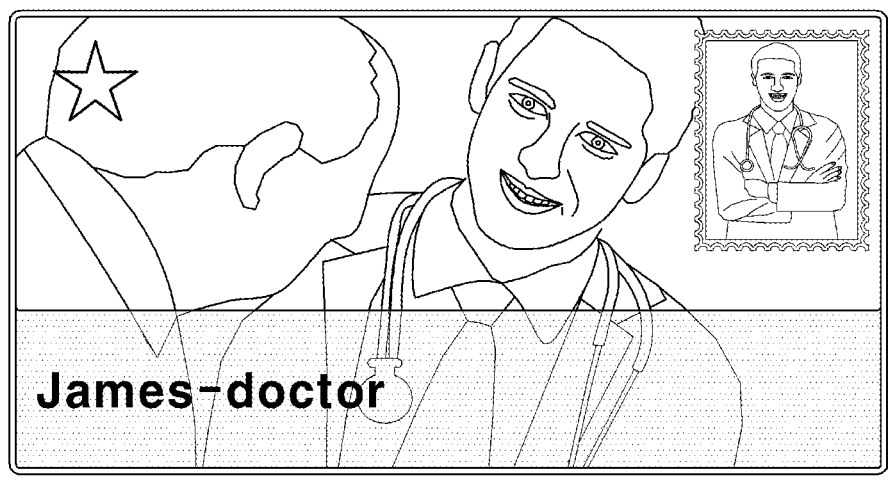
FIGS. 17A and 17B are diagrams showing an example of displaying an emphasized profile image card according to an embodiment of the present disclosure.
Figure 17B:
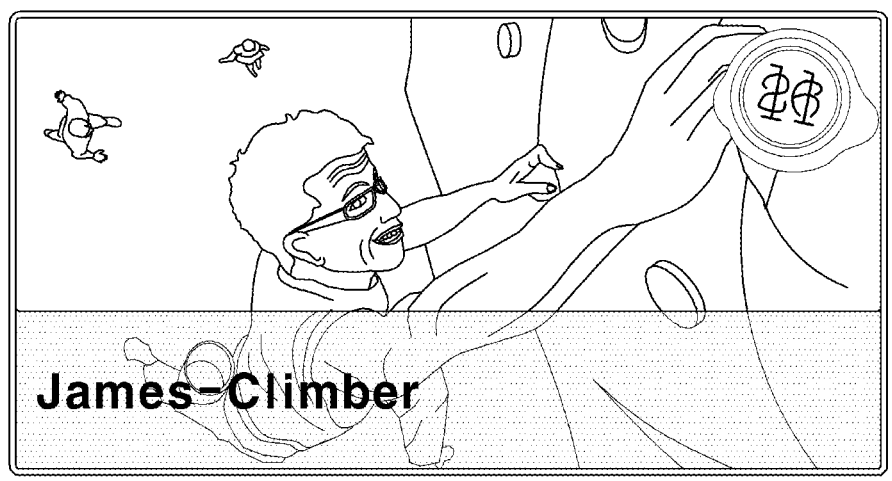

FIGS. 17A and 17B are diagrams showing an example of displaying an emphasized profile image card according to an embodiment of the present disclosure.

Referring to FIG. 17A, if the ranking of a profile image card of a doctor 'James' is within the top ten rankings in a category 'doctor,' the server 2000 may certify the expertise of the doctor 'James' and may attach a star-like stamp image to the profile image card of the doctor 'James.' Of course, stamp images other than a star-like stamp image may be used.

Furthermore, referring to FIG. 17B, if the ranking of a profile image card of a climber 'James' is within the top ten rankings in a category 'climber,' the server 2000 may certify the expertise of the climber 'James' and may increase a thickness of the borderlines of the profile image card of the climber 'James.'

Figure 18:
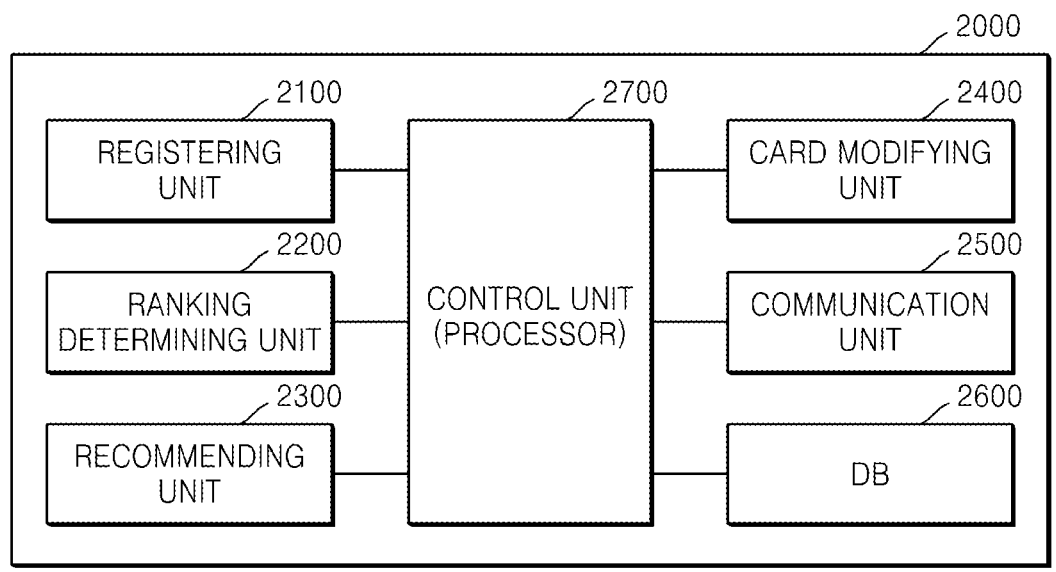
FIG. 18 is a block diagram showing a server according to an embodiment of the present disclosure.

FIG. 18 is a block diagram showing a server according to an embodiment of the present disclosure.

Referring to FIG. 18, the server 2000 includes a registering unit 2100, a ranking determining unit 2200, a recommending unit 2300, a card modifying unit 2400, a communication unit 2500, the DB 2600, and a control unit 2700.

The registering unit 2100 obtains a profile image card and registers the profile image card to the DB 2600 described below. The registering unit 2100 may receive a profile image card from the device 1000 via the communication unit 2500 described below. The device 1000 may provide a profile image card to the server 2000 via a web page provided by the server 2000. Furthermore, the device 1000 may transmit a profile image card to the server 2000 via an application installed in the device 1000.

Furthermore, the registering unit 2100 may match the identifier of the device 1000, the identifier of a user of the device 1000, and the profile image card and may register the profile image card to the DB 2600. In this case, a plurality of profile image cards matched to the user of the device 1000 may be registered. Furthermore, another device may select and use at least one of the plurality of profile image cards of the user of the device 1000.

Furthermore, the registering unit 2100 may categorize profile image cards. The registering unit 2100 may recognize information regarding categories of profile image cards from category tags attached to stamp images of the profile image cards. Furthermore, the registering unit 2100 may categorize profile image cards based on recognized category information. Categories of profile image cards may be preset based on fields of interest, occupations, ages, genders, specialties of users, and the like. However, the present disclosure is not limited thereto. Furthermore, category tags attached to stamp images may include information regarding categories of profile image cards. Category tags may include information regarding fields of interest, occupations, ages, genders, and specialties of users, for example.

Furthermore, profile image cards may be included in a plurality of upper/lower categories. For example, a profile image card may be included in an upper category "doctor" and a lower category "internal medicine doctor."

The ranking determining unit 2200 determines rankings of profile image cards. The ranking determining unit 2200 may receive evaluation information regarding profile image cards from the device 1000 and may determine rankings of the profile image cards. In this case, the device 1000 may provide the evaluation information to the ranking determining unit 2200 via a web page provided by the server 2000. Furthermore, the device 1000 may directly transmit the evaluation information to the server 2000 via an application installed in the device 1000.

Evaluation information may include identifiers of profile image cards, identifiers of users of the profile image cards, identifiers of users who evaluated the profile image cards, information regarding recommendations of the respective profile image cards, information regarding evaluation scores of the profile image cards, and the like for example. However, the present disclosure is not limited thereto.

Furthermore, the ranking determining unit 2200 may use preset evaluation information for determining rankings of profile image cards. For example, the ranking determining unit 2200 may determine rankings of profile image cards by using evaluation information received from all users who joined a profile image card providing service provided by the server 2000. Furthermore, the ranking determining unit 2200 may determine rankings of profile image cards by using evaluation information received from specialists related to categories of the profile image cards, for example. Furthermore, the ranking determining unit 2200 may determine rankings of profile image cards by using evaluation information received from acquaintances of a user of the device 1000, from which the profile image cards are to be received, for example. However, the present disclosure is not limited thereto.

Furthermore, if the ranking of a profile image card is within a preset range, the ranking determining unit 2200 may certify the expertise of a user corresponding to the profile image card. For example, if the ranking of a profile image card is within the top ten rankings regarding a designated category, the ranking determining unit 2200 may certify the expertise of a user corresponding to the profile image card.

The recommending unit 2300 recommends a profile image card received by the device 1000. Furthermore, the recommending unit 2300 may generate a list of recommendations regarding profile image cards. The recommending unit 2300 may generate a list of recommendations of profile image cards for each of the categories. In this case, the recommending unit 2300 may generate a list of profile image cards within a designated ranking range from among profile image cards belonging to a designated category.

Furthermore, the recommending unit 2300 may respectively generate a list of recommendations regarding profile image cards for each user that wants to receive profile image cards. In this case, the recommending unit 2300 may generate a list of recommendations regarding profile image cards related to a user that wants to receive profile image cards. For example, the recommending unit 2300 may generate a list of recommendations related to a user that wants to receive based on evaluation information of acquaintances of the user.

The card modifying unit 2400 may add an image effect to a profile image card. When the expertise of a user corresponding to the profile image card is certified, the card modifying unit 2400 may change an image representing the profile image card. For example, the card modifying unit 2400 may change a color of the profile image card or may attach a stamp image indicating the expertise to the profile image card. However, the present disclosure is not limited thereto.

The communication unit 2500 transmits/receives data necessary for sharing profile image cards to/from the device 1000. For example, the communication unit 2500 may transmit/receive profile image cards, user information, evaluation information, and lists of recommendations to/from the device 1000. However, the present disclosure is not limited thereto.

The DB 2600 stores data necessary for sharing profile image cards. For example, the DB 2600 may store profile image cards, user information, evaluation information, and lists of recommendations. However, the present disclosure is not limited thereto.

The control unit 2700 controls the overall operations of the server 2000. The control unit 2700 controls the registering unit 2100, the ranking determining unit 2200, the card modifying unit 2400, the recommending unit 2300, the communication unit 2500, and the DB 2600, such that the server 2000 may share profile image cards.

Figure 19:
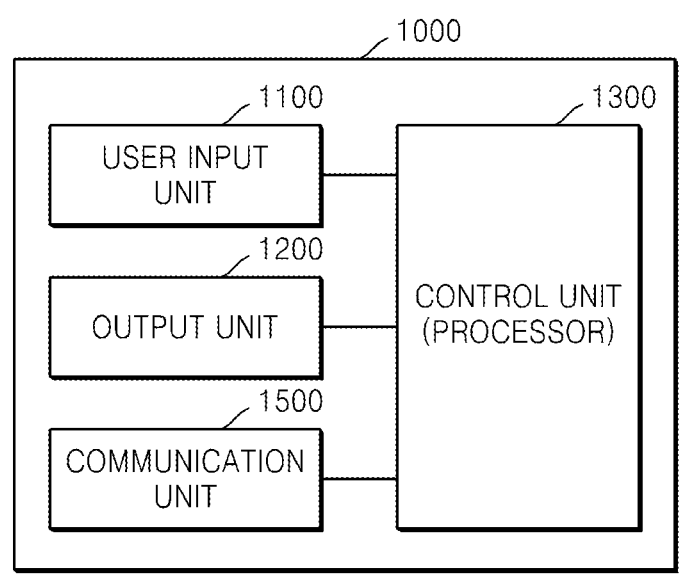
FIGS. 19 and 20 are block diagrams for describing a configuration of a device according to an embodiment of the present disclosure.
Figure 20:
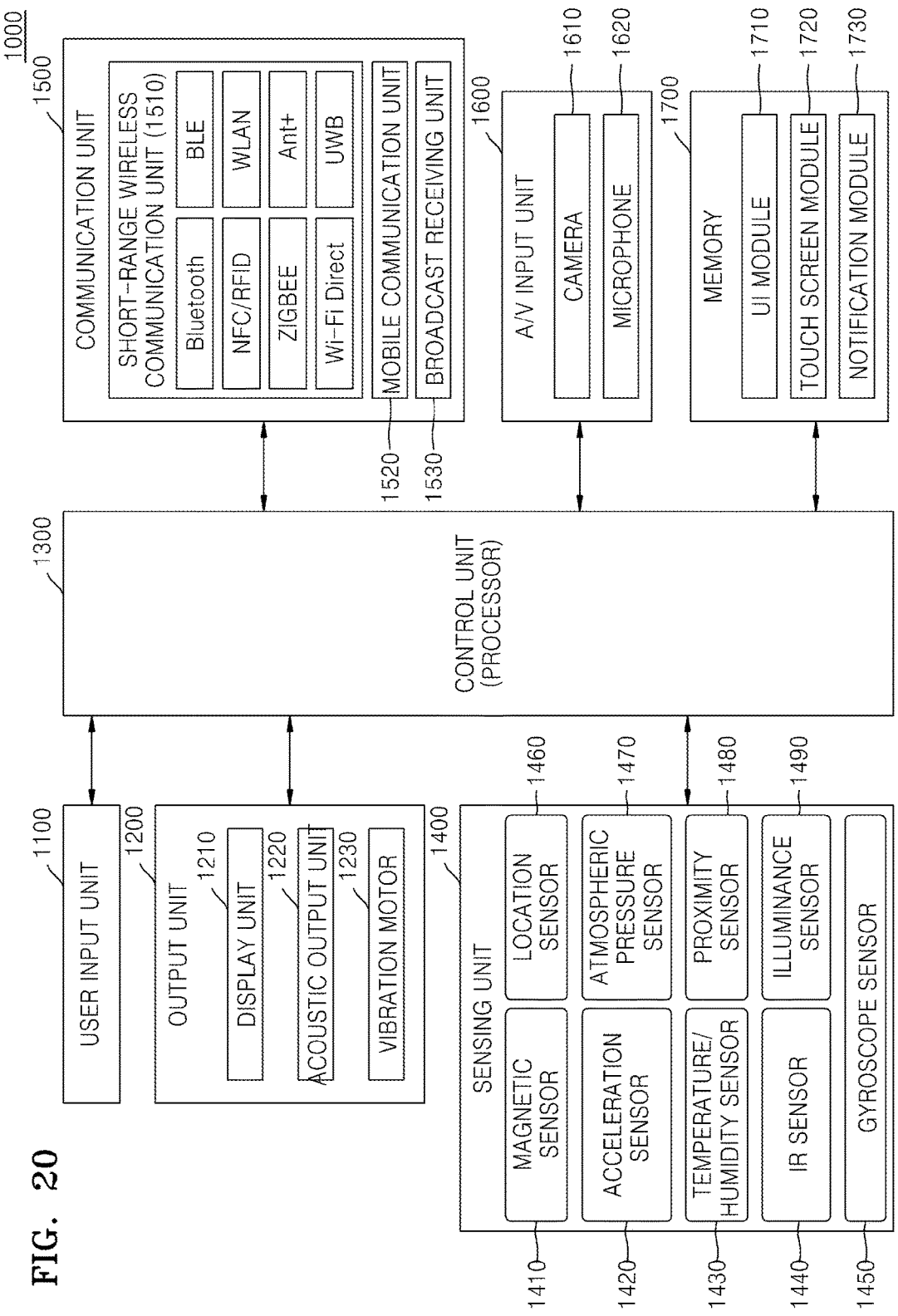

FIGS. 19 and 20 are block diagrams for describing the configuration of a device according to an embodiment of the present disclosure.

Referring to FIG. 19, the device 1000 according to an embodiment of the present disclosure may include a user input unit 1100, an output unit 1200, the control unit 1300, and a communication unit 1500. However, not all of the above components are necessary components. The device 1000 may be embodied with more components or fewer components than shown in FIG. 19.

For example, as shown in FIG. 20, the device 1000 may further include a sensing unit 1400, an A/V input unit 1600, and a memory 1700 other than the user input unit 1100, the output unit 1200, the control unit 1300, and the communication unit 1500.

A more detailed description thereof will be given below.

The user input unit 1100 refers to a unit for a user to input data for controlling the device 1000. For example, the user input unit 1100 may include a key pad, a dome switch, a touch pad (e.g., a contact electrostatic capacitive type, a pressure resistive film type, an infrared detection type, a surface acoustic wave propagation type, an integral strain gauge type, a piezo-effect type, etc.), a jog wheel, and a jog switch. However, the present disclosure is not limited thereto.

The user input unit 1100 may receive a user input. For example, the user input unit 1100 may receive a user input for generating and registering a profile image card, a user input for executing an application, and a user input for attaching a stamp image to a UI object.

The output unit 1200 is a unit for outputting an acoustic signal, a video signal, or a vibration signal and may include a display unit 1210, an acoustic output unit 1220, and a vibrating motor 1230.

The display unit 1210 is controlled by the control unit 1300 described below and displays data processed by the device 1000. The display unit 1210 may display a profile image card and a list of recommendations.

Meanwhile, if the display unit 1210 and a touch pad form a layered structure and are configured as a touch screen, the display unit 1210 may be used not only as an output device, but also as an input device. The display unit 1210 may include at least one of a liquid crystal display (LCD), a thin-film transistor liquid crystal display (TFT-LCD), an organic light emitting diode (OLED), a flexible display, a 3D display, and an electrophoretic display. Furthermore, according to various embodiments of the present disclosure, the device 1000 may include two or more display units 1210. In this case, the two or more display units 1210 may be arranged to face each other across a hinge.

The acoustic output unit 1220 outputs audio data received from the communication unit 1500 or stored in the memory 1700. Furthermore, the acoustic output unit 1220 outputs acoustic signals related to functions performed by the device 1000 (e.g., a call signal reception sound, a message reception sound, a notification sound, etc.) The acoustic output unit 1220 may include a speaker, a buzzer, etc.

The vibrating motor 1230 may output a vibrating signal. For example, the vibrating motor 1230 may output vibration signals corresponding to audio data or video data (e.g., a call signal reception sound, a message reception sound, etc.). Furthermore, the vibrating motor 1230 may output a vibration signal when a touch is input to a touch screen.

The control unit 1300 generally controls the overall operations of the device 1000. For example, the control unit 1300 may control the overall operations of the user input unit 1100, the output unit 1200, the sensing unit 1400, the communication unit 1500, and the A/V input unit 1600 by executing programs stored in the memory 1700. Furthermore, the control unit 1300 may enable the device 1000 to generate, evaluate, and share profile image cards by controlling the user input unit 1100, the output unit 1200, the sensing unit 1400, the communication unit 1500, and the A/V input unit 1600.

In more detail, the control unit 1300 may generate a profile image card. To generate a profile image card, the control unit 1300 may select a designated template and determine contents to be included in the selected template. Furthermore, the control unit 1300 may attach a stamp image to a profile image card. Furthermore, a tag indicating a category of a profile image card may be attached to a stamp image. A tag attached to a stamp image may be used by the server 2000 and the device 1000 to categorize a corresponding profile image card.

Furthermore, the control unit 1300 may register a profile image card to at least one of a memory of the device 1000 and the server 2000. The control unit 1300 may match the identifier of the device 1000, the identifier of a user of the device 1000, and the profile image card and may register the profile image card to the memory of the device 1000. If the device 1000 generated a plurality of profile image cards, the control unit 1300 may register a plurality of profile image cards.

Furthermore, the control unit 1300 may categorize profile image cards. The control unit 1300 may recognize information regarding categories of profile image cards from category tags attached to stamp images of the profile image cards. Furthermore, the control unit 1300 may categorize profile image cards based on recognized category information.

Furthermore, the control unit 1300 may evaluate a profile image card based on a user input. A user of the device 1000 may evaluate a service provided by a user corresponding to a particular profile image card. For example, in the case of a profile image card of 'James' who is a 'climber,' a user of the device 1000 may evaluate climbing skills of 'James,' and may input evaluation information regarding a profile image card of 'James' to the device 1000. Furthermore, a user of the device 1000 may give a score or may or may not recommend a profile image card of 'James.' Furthermore, the control unit 1300 may evaluate a profile image card by using evaluation information and lists of recommendations received from the server 2000 and another device.

Furthermore, the control unit 1300 may generate and update a list of recommendations regarding profile image cards. The first device 1010 may determine rankings of profile image cards based on evaluation information and lists of recommendations received from another device and the server 2000. Furthermore, the control unit 1300 may generate and update a list of recommendations regarding the profile image cards based on the determined rankings.

Furthermore, the control unit 1300 may share generated lists of recommendations, profile image cards, evaluation information, and user information with another device and the server 2000 by controlling the communication unit 1500.

The sensing unit 1400 may detect a status of the device 1000 or a status of information about an external environment of the device 1000 and transmit detected information to the control unit 1300.

The sensing unit 1400 may include at least one of a magnetic sensor 1410, an acceleration sensor 1420, a temperature/humidity sensor 1430, an IR sensor 1440, a gyroscope sensor 1450, a position sensor 1460, an atmospheric pressure sensor 1470, a proximity sensor 1480, and an illuminance sensor 1490. However, the present disclosure is not limited thereto. Functions of the respective sensors may be intuitively inferred from names thereof by one of ordinary skill in the art, and thus detailed descriptions thereof will be omitted.

The communication unit 1500 may include one or more components enabling communication between the device 1000 and another device or between the device 1000 and the server 2000. For example, the communication unit 1500 may include a short-range wireless communication unit 1510, a mobile communication unit 1520, and a broadcast receiving unit 1530.

The short-range wireless communication unit 1510 may include a Bluetooth communication unit, a Bluetooth Low Energy (BLE) communication unit, a near field communication (NFC) unit, a wireless local area network (WLAN) communication unit, a Zigbee communication unit, an infrared data association (IrDA) communication unit, a Wi-Fi direct (WFD) communication unit, an ultra wideband (UWB) communication unit, and an Ant+ communication unit. However, the present disclosure is not limited thereto.

The mobile communication unit 1520 transmits/receives wireless signals to/from at least one of a station, an external terminal, and a server on a mobile communication network. Here, the wireless signals may include a voice call signal, a video call signal, or any of various types of data regarding transmission and reception of text/multimedia data.

The broadcast receiving unit 1530 receives broadcasting signals and/or broadcast-related data from outside via broadcasting channels. The broadcasting channels may include a satellite channel and a ground wave channel. According to various embodiments of the present disclosure, the device 1000 may not include the broadcast receiving unit 1530.

The communication unit 1500 is controlled by the control unit 1300 and transmits/receives data to/from another device and the server 2000. The communication unit 1500 may transmit data to another device directly or via the server 2000. Furthermore, the communication unit 1500 may receive data from another device directly or via the server 2000.

Furthermore, the communication unit 1500 may transmit/receive at least one of profile image cards, user information, evaluation information, and lists of recommendations to/from another device and the server 2000.

The A/V input unit 1600 is a unit for inputting audio signals or video signals and may include a camera 1610 and a microphone 1620. The camera 1610 may obtain a still image or an image frame, such as a moving picture, via an image sensor in a video call mode or an image capturing mode. An image captured via an image sensor may be processed by the control unit 1300 or a separate image processing unit (not shown).

An image frame processed by the camera 1610 may be stored in the memory 1700 or transmitted to outside via the communication unit 1500. According to various embodiments of the present disclosure, two or more cameras 1610 may be arranged.

The microphone 1620 receives an external acoustic signal and converts the acoustic signal into electric data. For example, the microphone 1620 may receive acoustic signals from an external device or a speaker. The microphone 1620 may employ any of various noise-reduction algorithms for reducing noise that occurs during reception of external acoustic signals.

The memory 1700 may store programs for processes and control operations of the control unit 1300 and may also store input/output data (e.g., a plurality of menus, a plurality of level 1 submenus respectively corresponding to the plurality of menus, a plurality of level 2 submenus respective corresponding to the plurality of level 1 submenus, etc.)

The memory 1700 may include at least from among a flash memory type storage medium, a hard disk type storage medium, a multimedia card micro type storage medium, a card type storage medium (e.g., a standard definition (SD) memory or an extreme definition (XD) memory), a random-access memory (RAM), a static RAM (SRAM), a read-only memory (ROM), an electrically erasable and programmable ROM (EEPROM), a programmable ROM (PROM), a magnetic memory, a magnetic disk, and an optical disc. Furthermore, the device 1000 may operate web storage or a cloud server which performs a storage function of the memory 1700 on the internet.

Programs stored in the memory 1700 may be categorized into a plurality of modules according to functions thereof, e.g., a UI module 1710, a touch screen module 1720, and a notification module 1730.

The UI module 1710 may provide a specialized UI or GUI that operates in conjunction with the device 1000 for each application. The touch screen module 1720 may detect a touch gesture of a user on a touch screen and may transmit information regarding the touch gesture to the control unit 1300. The touch screen module 1720 according to an embodiment of the present disclosure may recognize and analyze touch codes. The touch screen module 1720 may be embodied as separate hardware including a controller.

Various sensors may be arranged inside or nearby a touch screen to detect a touch on the touch screen or a proximity touch. An example of sensors for detecting a touch on a touch screen may be a tactile sensor. A tactile sensor refers to a sensor which detects contact of a particular object to a degree equal to or higher than the sensitivity of a human. A tactile sensor may detect various information, such as roughness of a contact surface, hardness of a contacting object, a temperature at a contact point, etc.

Furthermore, another example of a sensor for detecting a touch on a touch screen may be a proximity sensor.

A proximity sensor refers to a sensor which detects existence of an object approaching a designated detection surface or an object nearby the designated detection surface without any mechanical contact by using an electromagnetic force or an infrared ray. Examples of a proximity sensor include a transmissive photoelectric sensor, a direct-reflection type photoelectric sensor, a high-frequency emitting proximity sensor, an electrostatic capacitive proximity sensor, a magnetic proximity sensor, an infrared ray proximity sensor, etc. Touch gestures of a user may include a tap, a touch-and-hold, a double-tap, a drag, a pan, a flick, a drag-and-drop, a swipe, etc.

The notification module 1730 may generate a signal for notifying occurrence of an event at the device 1000. Examples of events occurring at the device 1000 may include a call signal reception, a message reception, a key signal reception, a schedule notification, etc. The notification module 1730 may output a notification signal in the form of a video signal via the display unit 1210, may output a notification signal in the form of an audio signal via the acoustic output unit 1220, or may output a notification signal in the form of a vibration signal via the vibrating motor 1230.

In addition, various other embodiments of the present disclosure can also be implemented through computer readable code/instructions in/on a medium, e.g., a computer readable medium, to control at least one processing element to implement any above described embodiment. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., compact disk-read only memory (CD-ROMs), or digital video disks (DVDs)), and transmission media such as Internet transmission media. Thus, the medium may be such a defined and measurable structure including or carrying a signal or information, such as a device carrying a bitstream according to one or more various embodiments of the present disclosure. The media may also be a distributed network, so that the computer readable code is stored/transferred and executed in a distributed fashion. Furthermore, the processing element could include a processor or a computer processor, and processing elements may be distributed and/or included in a single device.

It should be understood that the various embodiments described herein should be considered in a descriptive sense only and not for purposes of limitation. Descriptions of features or aspects within each embodiment should typically be considered as available for other similar features or aspects in other various embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of sharing profile image cards of a user of a device, the method performed by a server and comprising:
   obtaining profile image cards indicating profiles of a first user of a first device related to a plurality of fields of interest of the first user;
   categorizing the profile image cards based on pre-set categories;
   obtaining evaluation information of a second user of a second device regarding the profile image cards;
   determining rankings of the profile image cards for each of the categories based on the evaluation information; and
   transmitting a suggestion that the profile image cards be viewed to at least one other device based on the rankings of the profile image cards,
   wherein the profile image cards of the first user are generated corresponding to the plurality of fields of interest of the first user respectively,
   wherein the profile image cards are used in conjunction with a phonebook application of at least one of the first device, the second device and the at least one other device, are included in a list of users of the phonebook application, and are displayed on a display unit of at least one of the devices,
   wherein a profile image card selected among the profile images cards of the first user is matched with an identifier of the first user in the list of users displayed on the second device,
   wherein a stamp image is attached to the profile image card by the first user, and
   wherein the stamp image is a user interface object including a link address for using services provided by the first user, and the link address is for accessing a designated web page of the first user.

2. The method of claim 1, wherein the stamp image indicates an expertise of a user corresponding to a profile image card is attached to the profile image card.

3. The method of claim 1,
   wherein, in the determining of the rankings, rankings of the profile image cards regarding the second user are determined based on evaluation information of acquaintances of the second user, and
   wherein the method further comprises recommending the profile image cards to the second device based on the rankings regarding the second user.

4. The method of claim 1,
   wherein, in the obtaining of the profile image cards, the profile image cards are obtained from the first device accessing a web page provided by the server, and
   wherein the profile image cards are transmitted between the first device, the second device, and the at least one other device via an application installed in the first device, the second device, and the at least one other device.

5. The method of claim 1,
   wherein the evaluation information comprises identifiers of profile image cards, identifiers of users who evaluated the profile image cards, and information regarding recommendations of the respective profile image cards, and
   wherein the information regarding recommendations of the respective profile image cards comprises information regarding following numbers and card collecting numbers regarding the respective profile image cards.

6. The method of claim 1, wherein a profile image card is used in conjunction with an application installed in at least one of the first device, the second device, or the at least one other device and is displayed on a display unit of at least one of the devices via the application.

7. The method of claim 1,
wherein, in the obtaining of the evaluation information from the second device, a web page including the profile image card is provided to the second device, and
wherein, based on a user input that is input to the second device via the web page, the evaluation information is obtained from the second device.

8. The method of claim 1,
wherein the profile image card is displayed in a screen image of an application executed on the second device, and
wherein, in the obtaining of the evaluation information from the second device, the evaluation information is received from the second device based on a user input that is input to the second device via the screen image of the application executed on the second device.

9. The method of claim 1, wherein a profile image card comprises an image indicating the first user, a text for introducing the first user, and additional information regarding the first user, in relation to the plurality of fields of interest of the first user.

10. The method of claim 9, wherein a stamp image comprises a tag indicating the category of the profile image card.

11. A server for sharing profile image cards of devices, the server comprising:
a memory configured to store instructions; and
at least one processor configured to execute the stored instruction in order to:
categorize profile image cards indicating profiles of a first user of a first device related to a plurality of fields of interest of the first user based on pre-set categories,
determine rankings of the profile image cards for each of the categories based on evaluation information of a second user of a second device regarding the profile image cards, and
transmit a suggestion that the profile image cards be viewed to at least one other device based on the rankings of the profile image cards,
wherein the profile image cards of the first user are generated corresponding to the plurality of fields of interest of the first user respectively,
wherein the profile image cards are used in conjunction with a phonebook application of at least one of the first device, the second device and the at least one other device, are included in a list of users of the phonebook application, and are displayed on a display unit of at least one of the devices,
wherein a profile image card selected among the profile image cards of the first user is matched with an identifier of the first user in the list of users displayed on the second device,
wherein a stamp image is attached to the profile image card by the first user, and
wherein the stamp image is a user interface object including a link address for using services provided by the first user, and the link address is for accessing a designated web page of the first user.

12. The server of claim 11, wherein the stamp image indicates expertise of a user corresponding to the profile image card is attached to the profile image card.

13. The server of claim 11, wherein the at least one processor is further configured to:
determine rankings of the profile image card regarding the second user based on evaluation information of acquaintances of the second user, and
recommend the profile image cards to the second device based on the rankings regarding the second user.

14. The server of claim 11,
wherein the profile image cards are obtained from the first device accessing a web page provided by the server, and
wherein the profile image cards are transmitted between the first device, the second device, and the at least one other device via an application installed in the first device, the second device, and the at least one other device.

15. The server of claim 11,
wherein the evaluation information comprises identifiers of profile image cards, identifiers of users who evaluated the profile image cards, and information regarding recommendations of the respective profile image cards, and
wherein the information regarding recommendations of the respective profile image cards comprises information regarding following numbers and card collecting numbers regarding the respective profile image cards.

16. The server of claim 11, wherein the profile image card is used in conjunction with an application installed in at least one of the first device, the second device, or the at least one other device and is displayed on a display of at least one of the devices via the application.

17. The server of claim 11,
wherein, in the obtaining of the evaluation information from the second device, a web page including the profile image card is provided to the second device, and
wherein, based on a user input that is input to the second device via the web page, the evaluation information is obtained from the second device.

18. The server of claim 11,
wherein the profile image card is displayed in a screen image of an application executed on the second device, and
wherein the evaluation information is received from the second device based on a user input that is input to the second device via the screen image of the application executed on the second device.

19. The server of claim 11, wherein the profile image card comprises an image indicating the first user, a text for introducing the first user, and additional information regarding the first user, in relation to the plurality of fields of interest of the first user.

20. The server of claim 19, wherein a stamp image comprises a tag indicating the category of the profile image card.

21. A method of sharing profile image cards of a user via a first device, the method comprising:
obtaining profile image cards indicating profiles of a user of a second device in relation to a plurality of fields of interest of the user;
evaluating the obtained profile image cards; and
providing evaluation information regarding the obtained profile image cards to a server,
wherein rankings of the profile image cards are determined by the server based on the evaluation information, wherein a suggestion that the profile image cards be viewed are transmitted to a third device based on the determined rankings, wherein the profile image cards are used in conjunction with a phonebook application of at least one of the first device, the second device and the at least one other device, are included in a list of users of the phonebook application, and are displayed on a display unit of at least one of the devices, wherein a profile image card selected among the profile image cards of the user of the first device is matched with an identifier of the user of the first device in the list of users displayed on the second device, wherein a stamp image is attached to the profile image card by the user, and wherein the stamp image is a user interface object including a link address for using services provided by the user, and the link address is for accessing a designated web page of the user.

22. A non-transitory computer readable recording medium having recorded thereon a computer program for implementing the method of claim 21.

23. A method of sharing profile image cards via a first device, the method comprising:

receiving profile image cards indicating profiles of a user of a second device in relation to a plurality of fields of interest of the user from the second device;

evaluating the obtained profile image cards from the second device; and transmitting evaluation information regarding the obtained profile image cards to the first device, wherein rankings of the profile image cards are determined by the first device based on the evaluation information, wherein a suggestion that the profile image cards be viewed are transmitted to a third device based on the determined rankings, wherein the profile image cards of the user of the second device are generated corresponding to the plurality of fields of interest of the user of the second device respectively, wherein the profile image cards are used in conjunction with a phonebook application of at least one of the first device, the second device and the at least one other device, are included in a list of users of the phonebook application, and are displayed on a display unit of at least one of the devices, wherein a profile image card selected among the profile image cards of the user of the second device is matched with an identifier of the user of the second device in the list of users displayed on the second device, wherein a stamp image is attached to the profile image card by the user, and wherein the stamp image is a user interface object including a link address for using services provided by the user, and the link address is for accessing a designated web page of the user.

24. A non-transitory computer readable recording medium having recorded thereon a computer program for implementing the method of claim 23.

* * * * *